US005998576A

United States Patent [19]
Sadamitsu et al.

[11] Patent Number: 5,998,576

[45] Date of Patent: Dec. 7, 1999

[54] ROSIN-BASED MOLECULAR CRYSTALS, NUCLEATING AGENT FOR POLYOLEFIN AND POLYOLEFIN RESINS COMPOSITION AND MOLDINGS THEREOF

[75] Inventors: Kiyoshi Sadamitsu, Yawata; Masahide Ishikawa, Joyo; Toshiaki Kobayashi, Nara, all of Japan

[73] Assignee: New Japan Chemical Co., Ltd., Kyoto, Japan

[21] Appl. No.: 09/051,317

[22] PCT Filed: Aug. 7, 1997

[86] PCT No.: PCT/JP97/02740

§ 371 Date: Apr. 8, 1998

§ 102(e) Date: Apr. 8, 1998

[87] PCT Pub. No.: WO98/06784

PCT Pub. Date: Feb. 19, 1998

[30] Foreign Application Priority Data

| | | | |
|---|---|---|---|
| Aug. 8, 1996 | [JP] | Japan | 8-227765 |
| Nov. 11, 1996 | [JP] | Japan | 8-315441 |
| Dec. 27, 1996 | [JP] | Japan | 8-357654 |

[51] Int. Cl.[6] .......................... C08L 93/04; C08L 23/00; C08K 5/09

[52] U.S. Cl. .......................... 530/210; 530/224; 530/225; 524/270; 524/274; 524/764; 264/464

[58] Field of Search .................................... 530/210, 215, 530/216, 224, 225; 524/270, 274, 764; 264/464

[56] References Cited

U.S. PATENT DOCUMENTS 5,606,016 2/1997 Maeda et al. .......................... 530/210

FOREIGN PATENT DOCUMENTS 686 663 A1 12/1995 European Pat. Off. .

*Primary Examiner*—Nathan M. Nutter
*Attorney, Agent, or Firm*—Larson & Taylor

[57] ABSTRACT

This invention provides a rosin-based molecular crystal formed from the following component A and component B:

Component A: dehydroabietic acid or a rosin-based resin acid containing dehydroabietic acid as an essential constituent Component B: at least one rosin-based resin acid alkali metal salt selected from the class consisting of lithium, sodium and potassium salts of said component A, a polyolefin resin nucleating agent comprising the rosin-based molecular crystal, a polyolefin resin composition comprising the nucleating agent and if desired a calcium compound, and a molded article obtainable by molding the resin composition.

24 Claims, 1 Drawing Sheet

ROSIN-BASED MOLECULAR CRYSTALS, NUCLEATING AGENT FOR POLYOLEFIN AND POLYOLEFIN RESINS COMPOSITION AND MOLDINGS THEREOF

This application was filed under 35 USC 371 of PCT/JP97/02740 filed Aug. 7, 1997.

TECHNICAL FIELD

The present invention relates to novel and useful rosin-based molecular crystals, a polyolefin resin nucleating agent containing such rosin-based molecular crystals, a polyolefin resin composition containing said nucleating agent either alone or in combination with a calcium salt, and a molding thereof.

The term "molecular crystal" as used herein means a form of a complex of different molecular species A and B, and is a generic term denoting a crystal of a molecular compound formed when the respective molecules of compounds A and B, which can exist independently in a stable form, are bound together in a certain molar ratio (A/B) by physical intermolecular forces.

BACKGROUND ART

The nucleating agent for polyolefin resins is an additive for increasing the rate of crystallization of polyolefin resins and for improving their optical properties such as clarity and gloss, and their mechanical characteristics such as rigidity and elastic modulus.

For use as such a nucleating agent, several compositions each predominantly composed of rosin and/or a metal salt of rosin-based material have recently been proposed (Japanese Unexamined Patent Publications (Kokai) No. H7-330967, No. H7-331081, No. H8-277343, No. H8-277366).

However, the polyolefin resin nucleating agents described in the above patent literature, namely rosin and/or its metal salts, remain to be improved in terms of the heat resistance, oxidation resistance, moisture barrier properties, and blocking resistance. Furthermore, because of their high volatility and sublimability, those nucleating agents have the disadvantage of poor stability and causing poor workability in the processing of the polyolefin resin. Moreover, when rosins or their metal salts proposed are used alone, the effect of clarifying polyolefin resins is not necessarily fully satisfactory. In the case of a mixture of a rosin and a rosin metal salt, its dispersibility in resin is not good enough so that spots apparently attributable to the undispersed nucleating agent are formed in the resin molded products. Therefore, for the purpose of producing the intrinsic nucleating effects, the following contrivances have been proposed (Japanese Unexamined Patent Publications (Kokai) No. H7-330967, No. H7-331081, No. H8-277343, No. H8-277366).

(1) Melt-kneading with polyolefin resin is performed at least twice.

(2) Two or more rosin acid metal salts of different metal species are used in combination.

(3) At least one compatibilizer selected from the class consisting of rosin glycerol esters, antistatic agents, higher fatty acid metal salts, polyolefin wax, or hydrogenated petroleum resin is added to the nucleating agent.

However, any of those nucleating agents still has a great room for further improvement.

DISCLOSURE OF THE INVENTION

The object of the present invention is to overcome the above-mentioned disadvantages and to provide a novel and useful rosin type polyolefin resin nucleating agent having excellent effects of improving clarity, gloss, rigidity and moldability, a polyolefin resin composition containing said nucleating agent, and a molded article as molded from said composition.

The inventors made an extensive investigation of characteristics of various rosin compounds for accomplishing the above object, and discovered that the process of phase separation by crystallization of a solution or a melt containing a specific rosin-based type resin acid and an alkali metal salt thereof comprises not only the hitherto-known processes 1) and 2) mentioned below but also the following processes 3) and 4).

1) Formation of crystals of the rosin-based resin acid.

2) Formation of crystals of an alkali metal salt of the rosin-based resin acid.

3) Formation of molecular crystals each composed of the rosin-based resin acid and the alkali metal salt thereof in a molar ratio of 3/1.

4) Formation of molecular crystals each composed of the rosin-based resin acid and the alkali metal salt thereof in a molar ratio of 1/1.

In addition, the inventors succeeded in establishing a technology for selectively controlling the above-mentioned phase separation processes 3) and 4), and found that the molecular crystals obtainable in the processes 3) and 4) have an excellent nucleating effect on polyolefin resin.

On the other hand, none of the above patent publication teaches or even suggests that the above-mentioned four phase separation processes exist, that molecular crystals are formed in the above processes (3) and (4) or, that those molecular crystals are useful as a nucleating agent for polyolefin resin, nor does it disclose or suggest a methodology for selectively controlling the above phase separation processes 3) and 4).

More specifically, the inventors discovered that, under specific conditions, a specific rosin-based resin acid and a specific alkali metal salt thereof in a specific ratio specifically form a molecular crystal. The inventors further found that this molecular crystal is a substance not disclosed in the literature and, in addition, is of use as a nucleating agent for polyolefin resins, which overcomes the above-mentioned disadvantages. It has also been found that when the molecular crystal is used in combination with a calcium salt, the nucleating effect is further remarkably increased. The present invention has been accomplished on the basis of the above findings.

The rosin-based molecular crystal according to the present invention, thus, is characterized in that it is formed from the following component A and component B and the examples thereof includes a molecular crystal with a component A/component B molar ratio of 1/1 (hereinafter referred to as "1:1 molecular crystal") and a molecular crystal with a component A/component B molar ratio of 3/1 (hereinafter referred to as "3:1 molecular crystal").

Component A: dehydroabietic acid or a rosin-based resin acid containing dehydroabietic acid Component B: at least one rosin-based resin acid alkali metal salt selected from the class consisting of the lithium salt, sodium salt and potassium salt of component A Herein, one-mole of the rosin-based resin acid mentioned for component A can be calculated as follows. Thus, the rosin-based resin acid is a mixture of a plurality of carboxylic acids selected from the class consisting of dehydroabietic acid, abietic acid, isopimaric acid, levopimaric acid, dihydroabietic acid, neoabietic acid, tetrahydroabietic acid, ellitionoic acid, palustric acid, pimaric acid, sandaracopimaric acid, etc. but since all the constituent carboxylic acids are monocarboxylic acids (R—COOH), the average molecular weight of the component A rosin-based resin acid can be calculated from the acid value. For example, 1) One mole of a rosin-based resin acid with an acid value of 186 mg KOH/g is $(1/(186/56.1)\times1000=302$ (g).

where the value of 56.1 is the molecular weight of KOH.

2) One mole of the potassium salt of the above rosin-based resin acid of 1) above is $302+39.1-1.0=340$ (g)

where the values of 39.1 and 1.0 are the molecular weights of potassium and hydrogen, respectively.

3) When 1 g of a rosin-based resin acid with an acid value of 186 mg KOH/g is neutralized with 46.5 mg (=186/4) of KOH, 25 mole % of the rosin-based resin acid is neutralized to form a potassium salt thereof, with the remaining 75 mole % being unchanged as unneutralized rosin-based resin acid. In this case, the ratio of rosin-based resin acid (A) to its metal salt (potassium salt) (B) is A/B=75/25=3/1.

The present invention further provides a polyolefin resin nucleating agent containing the molecular crystals described above.

The present invention further provides a polyolefin resin composition comprising (i) a polyolefin resin and (ii), based on 100 parts by weight of said polyolefin resin, 0.01–2 parts by weight of the above-mentioned nucleating agent.

Further provided by the present invention is a molded article which can be molded from said resin composition.

BRIEF DESCRIPTION OF THE DRAWING

Referring to FIG. 1 and to the X-ray diffraction profile in the bottom row, an enlarged view of the range of $2\theta=4.0$–$10.0$ is presented in a window indicated by dot-dash lines.

DETAILED DESCRIPTION OF THE INVENTION

Rosin-based Molecular Crystals

Figure 1:
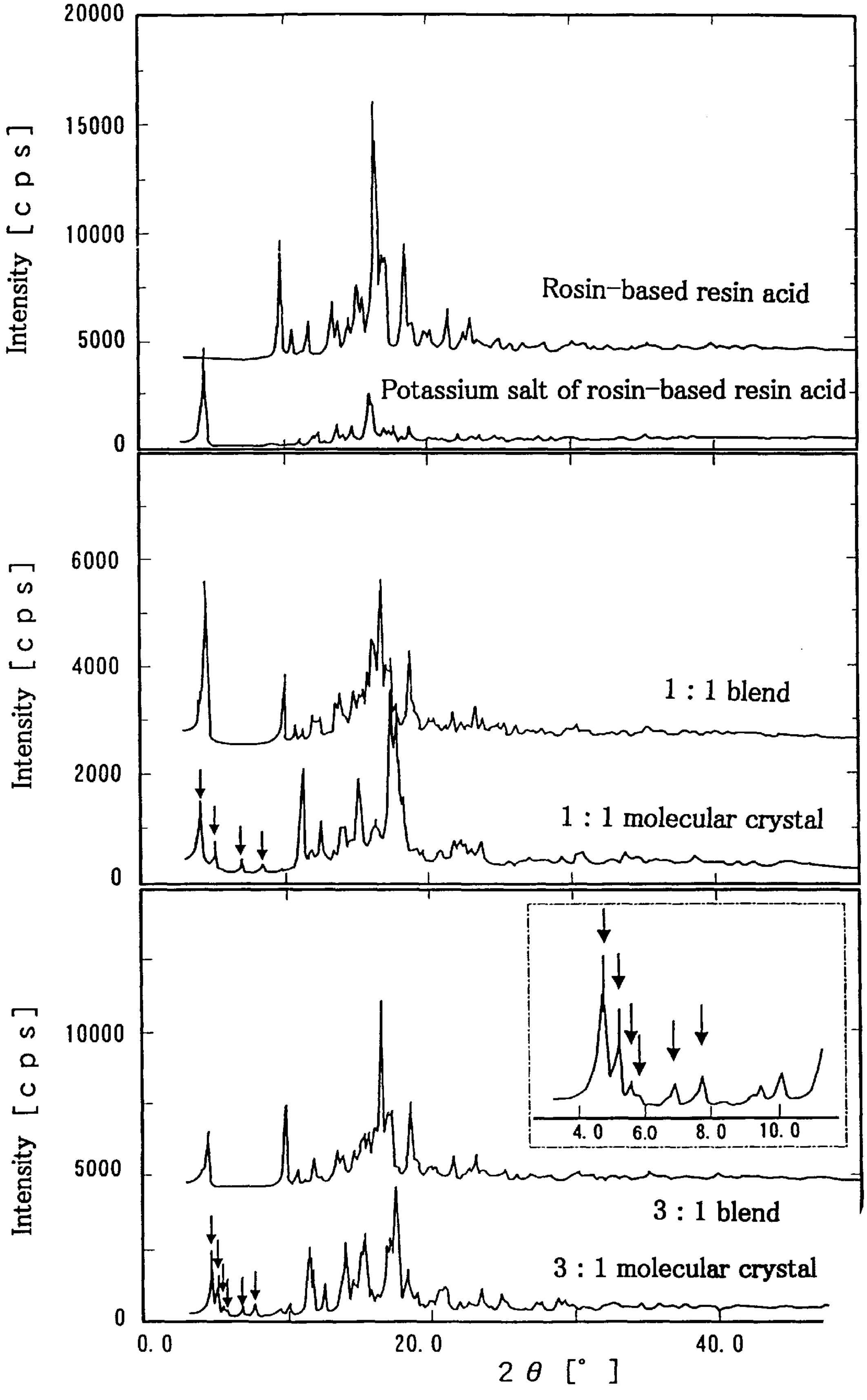
FIG. 1 shows the X-ray diffraction profiles of a rosin-based resin acid with a dehydroabietic acid content of 75 weight % and its potassium salt in the upper row, the X-ray diffraction profiles of a 1:1 mixture of said rosin-based resin acid and its potassium salt and the 1:1 molecular crystal of the invention (Example 8) in the middle row, and the X-ray diffraction profiles of a 3:1 mixture of said rosin-based resin acid and its potassium salt and the 3:1 molecular crystal of the invention (Example 9) in the bottom row.

Rosin in general is composed of approximately 90 weight % of a rosin-based resin acid and approximately 10 weight % of neutral substances. The rosin-based resin acid mentioned above comprises a plurality of monocarboxylic acids selected from among dehydroabietic acid, abietic acid, isopimaric acid, levopimaric acid, dihydroabietic acid, neoabietic acid, tetrahydroabietic acid, elliotinoic acid, palustric acid, pimaric acid, sandaracopimaric acid, etc. The neutral substances mentioned above comprise diterpene alcohols, aldehydes, methyl esters, hydrocarbons, etc. but these components do not take part in the formation of molecular crystals.

The rosin-based resin acid for use as component A in accordance with the present invention either consists of dehydroabietic acid alone or is a resin acid mixture containing dehydroabietic acid. The recommended dehydroabietic acid content of said resin acid mixture is not less than 30 weight %, preferably not less than 60 weight %, and more preferably, not less than 90 weight %. In addition, the recommended total amount of abietic acid, levopimaric acid, neoabietic acid and palustric acid is not more than 30 weight %, preferably not more than 15 weight %, and more preferably, not more than 5 weight %.

It is rather difficult to form molecular crystals when the dehydroabietic acid content is less than 30 weight % and the total content of abietic acid, levopimaric acid, neoabietic acid, and palustric acid exceeds 30 weight %.

A variety of resin acid mixtures which can be used in the present invention are commercially available and some of them can be easily purchased. However, a high-purity resin acid may be specially prepared and used as the starting material.

Component B for use in the present invention is at least one member selected from the class consisting of the lithium salt, sodium salt, and potassium salt of said component A. As will be described hereinafter, this component B is prepared in situ by neutralizing component A with the corresponding alkali metal compound. Component A and component B, occurring in such a neutralization reaction mixture or in a homogeneous solution or melt containing component B separately prepared and component A, form a molecular compound under certain conditions and further form molecular crystals under specific conditions.

The process for producing the rosin-based molecular crystals according to the present invention can be divided into two major steps. The first step comprises uniformly dissolving the rosin-based resin acid and an alkali metal salt thereof in an organic solvent or evenly melting them together. The second step is a step in which molecular crystals each composed of the rosin-based resin acid and alkali metal salt thereof are selectively formed from the homogeneous solution or homogeneous melt obtained in the first step.

The procedure for performing the first step may for example comprise partially neutralizing the rosin-based resin acid to give a homogeneous solution or melt in accordance with the known neutralizing technique, such as the solvent method or the melting method [e.g. Yoshida et al.: "The Properties and Application of Metal Soaps", Saiwai Shobo (1988)]. An alternative procedure comprises dissolving a rosin-based resin acid and a separately synthesized alkali metal salt thereof evenly in an organic solvent to prepare a homogeneous solution or melting the two substances together evenly to give a homogeneous melt.

Regarding the procedure for performing the second step, there are several variables for selective formation of molecular crystals depending on whether a solution has been obtained or a melt has been obtained in the first step. Briefly, when a solution has been obtained in the first step, the solvent is distilled off from the solution at a certain temperature for sequential selective formation of the molecular crystals of the invention or the distillation is stopped immediately before the beginning of crystallization and the system is allowed to stand at a certain temperature to obtain the molecular crystals of the invention. When a melt has been obtained in the first step, this melt is first cooled to a certain temperature and then maintained at that temperature to obtain the molecular crystals of the invention.

The method of producing the molecular crystals of the present invention is now described in further detail.

Starting Material

The starting rosin may be an ordinary rosin containing about 10 weight % of a neutral fraction or a rosin-based resin acid available upon elimination of the neutral fraction from the rosin. In either case, the recommended dehydroabietic acid content is not less than 30 weight %, preferably not less than 60 weight % and, more preferably, not less than 90 weight %, and the recommended total content of abietic acid, levopimaric acid, neoabietic acid and palustric acid is not more than 30 weight %, preferably not more than 15 weight %, and more preferably, not more than 5 weight %. Among them, the most preferred resin acid is dehydroabietic acid with a purity of 100%.

The alkali metal compound for use in said neutralization reaction includes alkali metal hydroxides such as sodium hydroxide, potassium hydroxide, lithium hydroxide, etc. and alkali metal alcoholates such as sodium alcoholate, potassium alcoholate, lithium alcoholate, etc. (the alkyl moiety of the alcoholate contains 1–8 carbon atoms). Among them, alkali metal hydroxides are recommended.

The metal species is at least one member selected from the group, consisting of sodium, potassium and lithium. When two or more metal species co-exist, the molecular crystal tends to be less ready to form as compared with the case in which the system contains only one metal species. Therefore, it is preferable to use one metal species. Of the above-mentioned metal species, potassium is the most preferred.

For convenience's sake, unless otherwise specified in this specification, the term "alkali metal" is used to mean at least one metal species selected from the group consisting of sodium, potassium and lithium.

The organic solvent for use in the neutralization reaction by the solvent method described below or the organic solvent for dissolving the separately prepared component A and component B evenly includes straight-chain or branched-chain alcohols each containing 1–4 carbon atoms, e.g. methanol, ethanol, isopropanol, etc., glycol ethers, diglyme and other ethers, and mixtures of said solvents with hydrocarbon series solvents such as n-hexane, n-heptane, cyclohexane, and so forth.

Selection of the kind of solvent for use is made with reference to the solubility of the rosin-based resin acid and alkali metal salt thereof in the organic solvent and the ease of formation of the molecular crystal according to the present invention. Methanol and ethanol are particularly recommended.

When a solvent, which dissolves only one of component A and component B, such as water (which dissolves only the alkali metal salt of the rosin-based resin acid) or kerosines such as n-hexane (which dissolve only the rosin-based resin acid) is used alone, the physical intermolecular forces indispensable for the formation of a molecular crystals are attenuated or lost and the unwanted rosin-based resin acid and/or its alkali metal salt, which does not take part in the formation of the molecular crystals, is precipitated, hence undesirable.

Even when a solvent favorable for the formation of said molecular crystals, for example an alcohol, is employed, water which may be contained therein has a profound influence on the formation of the molecular crystals. Thus, when a solvent with high water content is used, the rosin-based resin acid and/or its alkali metal salt, which does not take part in the formation of the molecular crystals, is also precipitated. The recommended water content of the solvent is not more than 10 weight %, preferably not more than 5 weight %, more preferably not more than 3 weight %, and for still better results, not more than 1 weight %. Furthermore, the amount of water relative to 100 parts by weight of the alkali metal salt of rosin-based resin acid in the system is also restricted to not more than 10 parts by weight, preferably not more than 7 parts by weight, and more preferably, not more than 5 parts by weight.

There is no particular limitation on the amount of the organic solvent to be used, but the recommended amount of the solvent is not more than 2000 parts by weight, preferably about 10–500 parts by weight, relative to 100 parts by weight of component A and component B combined.

First Step

1) When the Neutralization Reaction is Carried Out

The neutralization reaction, when it is adopted in the first step, can be carried out by the known solvent method or the known melting method.

(i) In the solvent method, the temperature of this neutralization reaction is room temperature to 160° C., preferably 40° C. to 100° C. The use of a reaction temperature below room temperature is undesirable, since the rosin-based resin acid and/or its alkali metal salt, which would not take part in the formation of the molecular crystals, may occasionally form crystals independently. The reaction time is not limited but, generally, a reaction time of about 1 to 120 minutes is sufficient.

The neutralization reaction can be carried out, for example, by dissolving said component A in the above-mentioned solvent with heating, adding an alkali metal compound in such an amount that the desired neutralization rate can be achieved, and stirring the mixture. It is usually preferable that the alkali metal compound is added as dissolved or dispersed beforehand in the same solvent as the solvent used for dissolving component A.

(ii) The melting process is a neutralization reaction carried out in the absence of a solvent. There is no particular limitation on the reaction temperature, but this neutralization reaction is advantageously carried out at a temperature between the melting point (e.g. 160° C.) of the rosin-based resin acid used and 300° C., preferably at 180° C. to 300° C., and more preferably, at 200° C. to 300° C. The neutralization reaction time is not so critical but generally ranges from 2 to 180 minutes. This neutralization reaction can be carried out, for example, by melting said component A with heating, adding to the resulting melt an alkali metal compound in such an amount that the desired neutralization rate can be achieved, and stirring the mixture.

In the above solvent process or in the above melting process, the reaction is preferably carried out under an inert gas such as nitrogen gas in order to prevent decomposition and coloration of the rosin-based resin acid.

2) When Component A is Blended With Component B Which Has Been Separately Prepared Compound A and compound B which has been separately provided are added to said solvent and dissolved therein with heating (solvent method), or alternatively a mixture of component A and component B which has been separately provided is evenly melted by heating (melting method). The heating temperature and heating time to be employed in the above solvent and melting methods may be similar to the reaction temperature and the reaction time mentioned for the solvent and melting methods, respectively, in the above-mentioned neutralization reaction.

Second Step

In this step, molecular crystals can be selectively obtained by controlling the process of phase separation due to crystallization.

1) When the solvent method is used

From the homogeneous solution obtained by the neutralization reaction in the first step carried out using a selected organic solvent, or from the homogeneous solution obtained by dissolving component A and separately provided component B in an organic solvent, the solvent is evaporated under atmospheric pressure or reduced pressure while the solution is maintained at a temperature of 30° C. or higher, preferably 40° C. or higher, more preferably 50° C. or higher, but not higher than the boiling point of the solvent, whereby molecular crystals are selectively formed.

As an alternative procedure, the distillation is stopped just before the beginning of crystallization, instead of removing the solvent completely, and the solution concentrated to about 30–90 weight %, preferably about 50–70 weight %, in terms of the concentration of the total amount of component A and component B combined, is allowed to stand at a temperature of 30° C. or higher, preferably 40° C. or higher, more preferably 50° C. or higher, but not higher than the boiling point of the solvent, whereby molecular crystals are selectively formed.

The molecular crystals thus formed are separated from the solution by filtration, rinsed with the same solvent as above, and dried.

In either case, the formation of molecular crystals can be accelerated by adding a small amount of molecular crystal seeds prepared beforehand to the solution. When a lower alcohol is used as the solvent, the formation of molecular crystals proceeds selectively without involvement of the objectionable coloration so that the filtration step may be omitted. Incidentally, if the system contains neutral substances originating from the starting rosin and the filtration step is omitted, a mixture of molecular crystals and neutral substances is obtained. From such a mixture, molecular crystals can be selectively isolated by re-dissolving the mixture in the same solvent as above, causing molecular crystals to form under the above-mentioned conditions, and filtering the reaction system.

In either of the above processes, water has a significant influence on the process of formation of molecular crystals. The use of a solvent with a high water content is not preferable, since the rosin-based resin acid and/or its alkali metal salt, which would not take part in the formation of molecular crystals, will be independently crystallized or vitrified. The recommended water content of the above-mentioned solvent is not more than 10 weight %, preferably not more than 5 weight %, more preferably, not more than 3 weight %, and for still better results, not more than 1 weight %. The amount of water in the system relative to 100 parts by weight of the alkali metal salt of rosin-based resin acid is also restricted to not more than 10 parts by weight, preferably not more than 7 parts by weight, and more preferably, not more than 5 parts by weight.

In the patent publications relating to the rosin-type nucleating agent, referred to hereinbefore (Japanese Unexamined Patent Publications (Kokai) No. H7-330967, No. H7-331081), no information is available on the conditions of distillation for removal of the solvent in the production of a rosin-type nucleating agent by the solvent method. However, for removing an organic solvent from a solution in an organic solvent in a commercial scale, it is common practice to add water to the solution and remove the water and solvent by steam distillation or azeotropic distillation, regardless of whether the solvent involved is a hydrophilic solvent or a hydrophobic solvent, for assuring the safety of operation, improved efficiency of solvent recovery, prevention of coloration of the precipitate, and suppression of the characteristic odor of the organic solvent (Japanese Unexamined Patent Publication (Kokai) No.S57-185288). However, the desired molecular crystals cannot be obtained by such practice.

2) When the melting method is used

Following the neutralization reaction, in the first step, at a temperature ranging from the melting point (e.g. 160° C.) of the rosin-based resin acid to 300° C., or after the uniform melting of a mixture of separately prepared components A and B at a temperature between the melting point (for example 160° C.) of the rosin-based resin acid and 300° C., the resulting molten mass is cooled, without regard to the cooling rate, to a specific temperature, specifically in a temperature region ranging from around the melting point of the molecular crystal to the supercooling temperature, and this temperature is maintained for about 10 to 120 minutes to form molecular crystals. The formation of molecular crystals can be accelerated by adding a small amount of separately prepared molecular crystal seeds to the mass immediately after cooling.

When the system contains neutral substances originating from the starting rosin, a mixture of molecular crystals and neutral substances is obtained. The molecular crystals can be separated from such a mixture in the same manner as in the solvent process, namely by redissolving the mixture in an organic solvent for recrystallization and collecting the recrystallized molecular crystals by filtration.

The above-mentioned patent publications on the rosin-type nucleating agent (Japanese Unexamined Patent Publications (Kokai) No. H7-330967 and No. H7-331081) contains no information about the influence of water or the temperature conditions to be used in the production of a rosin-type nucleating agent by the melting method. However, in the commercial production of metal soaps by the melting method, it is common practice to add water to the system (semi-melt process) or quench the melt to solidify by the spray granulation technique for improved production efficiency, better control over the shape and hardness of the product metal soap, and prevention of its coloration and decomposition (e.g. Yoshida et al.: "The Properties and Application of Metal Soaps", Saiwai Shobo, 1988). However, the desired molecular crystals cannot be obtained by such a procedure.

Thus, by controlling the water content, temperature, solvent species, and concentration of the system during the process of phase separation by crystallization in the second step, it is now possible to inhibit independent crystallization of the rosin-based resin acid and its alkali metal salt and allow selective formation of the molecular crystal.

Preferred procedures for the production of the 1:1 molecular crystal and/or the 3:1 molecular crystal are now described in further detail.

1) Solvent Method

The 1:1 molecular crystal can be produced typically as follows. The rosin-based resin acid defined hereinbefore is neutralized with an alkali metal hydroxide in ethanol having a water content of not more than 1 weight % at a neutralization rate of 50 mole %, and the ethanol is then distilled off under atmospheric pressure (solution temperature 78° C.) until immediately before the beginning of crystallization. The solution thus concentrated to not less than 50 weight % in terms of the concentration of the total amount of component A and component B combined is allowed to stand at 60° C. for the formation of molecular crystals and, then, filtered. The cake obtained is rinsed with ethanol and dried in vacuo at 80° C.

The 3:1 molecular crystal can be obtained typically as follows. The rosin-based resin acid defined hereinbefore is neutralized with an alkali metal hydroxide in ethanol with a water content of not more than 1 weight % at a neutralization rate of 25 mole %, and the ethanol is then evaporated under atmospheric pressure (solution temperature 78° C.) until immediately before the beginning of crystallization. The solution thus concentrated to not less than 50 weight % in terms of the concentration of the total amount of component A and component B combined is allowed to stand at 60° C. to form molecular crystals and, then, filtered. The cake thus obtained is rinsed with ethanol and dried in vacuo at 80° C.

Moreover, by varying the above-mentioned neutralization rate ($\chi$) within the range of $25<\chi<50$ mole % and conducting a process of the separation by crystallization in ethanol, for instance, a molecular crystal crop consisting exclusively of 1:1 and 3:1 molecular crystals can be obtained. As the neutralization rate exceeds 25% and approaches to 50%, the proportion of 1:1 molecular crystals in the crystal crop is increased and conversely the proportion of 3:1 molecular crystals is decreased. The range of neutralization rate ($\chi$) providing for a crystal crop consisting substantially exclusively of 3:1 molecular crystals and/or 1:1 molecular crystals is $25\leqq\chi\leqq50\%$. Outside this range of $\chi$, inclusion of the rosin-based resin acid or its alkali metal salt which does not take part in the formation of molecular crystals will be inevitable how ingeniously the conditions of separation by crystallization are controlled. In such cases, the crystal crop can be purified by recrystallization from ethanol, for instance, to provide molecular crystals only.

Herein, the "neutralization rate" means the percentage (%) of the number of moles of neutralized carboxyl groups (—COOM, where M═K, Na, or Li), relative to the sum of the number of moles of carboxyl (—COOH) groups and the number of moles of neutralized carboxyl groups (—COOM, where M═K, Na, or Li).

2) Melting Method

The 1:1 molecular crystal can also be produced by heating a mixture (1:1, by mole) of a rosin-based resin acid and its alkali metal salt at 280° C. to prepare a homogeneous melt, cooling the melt to a temperature of generally about 140° C. to 240° C., preferably about 150° C. to 200° C., and more preferably about 160° C., and allowing it to stand at this temperature for about 10 to 120 minutes to form crystals.

The 3:1 molecular crystal can also be produced by heating a mixture (3:1, by mole) of a rosin-based resin acid and its alkali metal salt at 280° C. to prepare a homogeneous melt, cooling the melt to a temperature of generally about 120° C. to 220° C., preferably about 130° C. to 180° C., and more preferably about 140° C., and allowing it to stand at that temperature for about 10 to 120 minutes to form crystals.

A crystal crop consisting substantially exclusively of the 1:1 and 3:1 molecular crystals can be obtained by varying the molar ratio of said rosin-based resin acid and the alkali metal salt thereof within the range of 3:1 to 1:1, heating the mixture, for example at 280° C., to prepare a homogeneous melt, cooling the melt to a temperature of generally about 130 to 220° C., preferably about 140 to 180° C., and more preferably about 150° C., and allowing it to stand at that temperature for about 10–120 minutes to form crystals. As the above-mentioned molar ratio exceeds 3:1 and approaches to 1:1, the proportion of 1:1 molecular crystals in the crystal crop is increased and the proportion of 3:1 molecular crystals is decreased. The range of the molar ratio providing for a crystal crop consisting substantially exclusively of 3:1 and/or 1:1 molecular crystals is 3:1 to 1:1. Outside this range, inclusion of the rosin-based resin acid or its alkali metal salt which dose not take part in the formation of molecular crystals will be inevitable how ingeniously the conditions of separation by crystallization are controlled. In such cases, the resulting crystal crop can be purified by recrystallization from ethanol, for instance, to provide the objective molecular crystals only.

In either case, a mixture of a rosin-based resin acid and its alkali metal salt (molar ratio 3:1 to 1:1) is heated at the above-mentioned temperature for about 2 to 180 minutes, preferably about 10 to 60 minutes, to prepare a homogeneous melt, and this melt is cooled to said temperature and allowed to stand at that temperature for about 10 to 120 minutes to effect crystallization. The whole crystal crop thus obtained is a crop of the desired molecular crystals (3:1 molecular crystals, 1:1 molecular crystals, or their mixture). However, since the melting process tends to involve coloration of molecular crystals and requires a purification procedure by solvent rinse or by recrystallization, the solvent method is preferred.

The 1:1 molecular crystal or 3:1 molecular crystal provided by the above processes is not a mere blend of the rosin-based resin acid and its alkali metal salt but is a crystal of a molecular compound formed as physical intermolecular forces act between the rosin-based resin acid molecule and the alkali metal salt molecule. The foregoing is evident from the following facts.

(1) In differential scanning calorimetry (hereinafter referred to as "DSC"), the molecular crystal according to the present invention shows a single fusion peak at a temperature different from that of the starting rosin-based resin acid. On the other hand, the alkali metal salt of the same rosin-based resin acid decomposes without showing a melting point. Moreover, any blend of the rosin-based resin acid and its alkali metal salt either shows a plurality of fusion peaks inclusive of the peak of the rosin-based resin acid or does not show a definite fusion peak.

(2) In infrared spectroscopic analysis, the molecular crystal according to the present invention shows characteristic absorption peaks which are deviated from the absorption bands of any of the rosin-based resin acid, its alkali metal salt, and a blend thereof.

(3) In the crystallographic comparison by using an X-ray diffractometer, the diffraction profile of a blend of a rosin-based resin acid and an alkali metal salt thereof, each prepared separately and dry-blended at room temperature, is a superposition of the respective profiles of the rosin-based resin acid and the rosin-based resin acid alkali metal salt, but the molecular crystal of the present invention shows an intrinsic diffraction profile different from the above-mentioned diffraction, indicating that the molecular crystal of the invention has an obviously intrinsic crystal form different from the above blend.

(4) This molecular crystal remains unchanged in acid value and metal content, even if said recrystallization from a solvent under the above specific conditions is repeated.

(5) The molecular crystal obtained by the above recrystallization procedure (4) is treated with diethyl ether and water to extract its component A into the organic layer and its component B into the aqueous layer for separation. Then, the aqueous layer containing component B is adjusted to pH 4–5 with diluted hydrochloric acid to recover component B as the free rosin-based resin acid. When analyzed by gas chromatography, the component A separated as above and the rosin-based resin acid recovered from component B as above give the same analytical values.

Furthermore, when the molecular crystal of the invention is recrystallized, the resin acid composition of component A after recrystallization is identical to its resin acid composition prior to recrystallization, and the resin acid composition of component B after recrystallization is identical to its resin acid composition prior to recrystallization.

Nucleating Agent for Polyolefin Resins

The rosin-based 1:1 molecular crystal and/or rosin-based 3:1 molecular crystal according to the present invention is(are) of value as a nucleating agent for polyolefin resin. Compared with the conventional blend of rosin and its alkali metal salt, the molecular crystal is less hygroscopic and superior in blocking resistance ("blocking" means caking of the powder due to coagulation and, because of its low sublimability and volatility, insures good workability in the molding of polyolefin resin.

Moreover, unlike the conventional blend of a rosin and its metal salt, the molecular crystal according to the present invention is a high-melting crystalline substance and, hence, is superior in oxidation resistance and heat stability and has a good storage stability. Furthermore, this molecular crystal is highly dispersible in polyolefin resin and insures an increased crystallization rate of polyolefin resin. Moreover, articles molded from a polyolefin resin composition containing this nucleating agent is very satisfactory in mechanical characteristics such as elastic modulus and optical characteristics such as clarity and gloss.

In addition, unlike the conventional blend of a rosin and its metal salt, this molecular crystal shows a definite, intrinsic melting point in the neighborhood of the routine melt-kneading temperature (150 to 300° C.) for ordinary polyolefin resin and features very satisfactory dispersibility and solubility in polyolefin resin. Therefore, the intrinsic performance characteristics as a nucleating agent can be produced upon mere single melt-kneading thereof with the resin even without the need for addition of any compatibilizer.

The particle size of the nucleating agent of the present invention, generally speaking, is preferably small from the standpoint of dispersibility and solubility in the polyolefin resin, and may for example be not more than 500 $\mu$m, preferably not more than 300 $\mu$m, and more preferably, 200 $\mu$m or less but 1 $\mu$m or more. If the particles are extremely small, for example less than 1 $\mu$m in diameter, the powder tends to undergo blocking, hence not preferable. Thus, for improved dispersibility and solubility in polyolefin resins, the nucleating agent is preferably milled or otherwise comminuted before addition to polyolefin resin.

This milling can be achieved by the known technology using a pin mill, disk mill, hammer mill, or the like. The nucleating agent may be dry-milled or wet-milled. However, the solvent for use in the wet milling process should be selected taking the stability of the molecular crystal into consideration. For example, the organic solvent used in the formation of the molecular crystal can be used with advantage. However, wet milling in an aqueous system is undesirable because the molecular crystal will be decomposed to its constituent rosin-based resin acid and alkali metal salt. The microgranulation technology using an emulsion system comprising water and an organic solvent is also undesirable, since this technique also causes decomposition of the molecular crystal to the rosin-based resin acid and its alkali metal salt.

Meanwhile, in order to suppress dusting when feeding the nucleating agent for improved working environment, it is preferable to granulate the nucleating agent into a shape such as spheres or cylinders beforehand. The size of such granulates is not particularly critical only if dusting can be effectively controlled. Generally speaking, satisfactory results are obtained when the diameter of spheres is about 0.1 to about 2.0 mm or when the size of cylinders is about 0.1 to about 2.0 mm in diameter and about 0.1 to about 5.0 mm high. Generally speaking, granulation of a nucleating agent detracts from its dispersibility in polyolefin resin. Therefore, when a granular nucleating agent is applied to polyolefin resin, the molding temperature of polyolefin resin should be set on the higher side (specifically not lower than 200° C., preferably not lower than 240° C.).

There is no particular limitation on the amount of the nucleating agent of the invention relative to a polyolefin resin. However, when the improving effect of nucleating agent and the factor of economics are taken into consideration, the following levels of addition can be generally employed. Thus, based on 100 parts by weight of a polyolefin resin, the nucleating agent is used in a proportion of 0.01 to 2 parts by weight, preferably 0.02 to 1.0 part by weight, and more preferably 0.05 to 0.8 part by weight. If the level of addition is below 0.01 part by weight, the desired effect will not be fully produced. Conversely, the addition of the nucleating agent in excess of 2 parts by weight is uneconomical.

Use in Combination With a Calcium Salt

The use of the nucleating agent of the present invention in combination with an organic or inorganic calcium salt is very effective. Thus, the nucleating agent of the invention and the calcium salt act synergistically so that compared with the case of adding the nucleating agent of the invention alone to the polyolefin resin, the effect of nucleation is remarkably increased.

The recommended species of calcium salt for use in the present invention includes calcium salts of organic acids such as aliphatic carboxylic acids having 2–50 carbon atoms, aliphatic sulfonic acids having 2–50 carbon atoms, aliphatic mono- or di-esters of phosphoric acid having 2–50 carbon atoms, aromatic carboxylic acids having 7–60 carbon atoms, aromatic sulfonic acids having 6–60 carbon atoms, aromatic mono- or diesters of phosphoric acid having 6–60 carbon atoms, alicyclic carboxylic acids having 7–60 carbon atoms, alicyclic sulfonic acids having 6–60 carbon atoms, or alicyclic mono- or diesters of phosphoric acid having 6–60 carbon atoms, and various inorganic salts of calcium. Those calcium salts can be used each independently or as a suitable mixture of two or more species.

Those calcium salts are either known or can be easily prepared by the known production technology.

The aliphatic carboxylic acid is preferably an aliphatic carboxylic acid containing about 8–30 carbon atoms, e.g. aliphatic monocarboxylic acids such as lactic acid, butyric acid, sorbic acid, levulinic acid, caproic acid, caprylic acid, nonanoic acid, decanoic acid, undecanoic acid, lauric acid, gluconic acid, stearic acid, oleic acid, 12-hydroxystearic acid, ricinolic acid, linoleic acid, linolenic acid, palmitic acid, behenic acid, montanic acid, etc.; aliphatic dicarboxylic acids such as malonic acid, fumaric acid, maleic acid, succinic acid, glutaric acid, methylglutaric acid, aspartic acid, malic acid, adipic acid, glutamic acid, tartaric acid, azelaic acid, sebacic acid, dimer acid, etc.; aliphatic polycarboxylic acids such as citric acid, butanetetra-carboxylic acid, tricarballylic acid, etc.; and branched-chain carboxylic acids such as isobutyric acid, octylic acid, isostearic acid, and so forth.

The aliphatic sulfonic acid is preferably an aliphatic sulfonic acid containing about 3–30 carbon atoms, such as alkyl($C_{3-30}$)ethersulfonic acids, alkene($C_{8-30}$)monosulfonic acids, and hydroxyalkane($C_{8-24}$)sulfonic acids, among others.

The aliphatic phosphoric ester is preferably an aliphatic phosphoric ester containing about 3–30 carbon atoms, such as phosphoric mono- and di-esters of alkyl($C_{2-30}$) alcohols.

The aromatic carboxylic acid is preferably an aromatic carboxylic acid containing about 7–30 carbon atoms, e.g. aromatic monocarboxylic acids such as benzoic acid, mono-, di-, tri-, or tetra-substituted benzoic acids as substituted by halogen, $C_{1-10}$ alkyl, alkenyl, or alkoxyl group (e.g. p-t-butylbenzoic acid, p-isobutylbenzoic acid, p-toluic acid, p-chlorobenzoic acid, cuminic acid, 3,5-dimethylbenzoic acid, p-ethyl-benzoic acid, p-methoxybenzoic acid, p-ethoxybenzoic acid, p-phenoxybenzoic acid, salicylic acid, o-benzoyl-benzoic acid, p-phenylbenzoic acid, etc.), α-naphthoic acid, mandelic acid, p-tolylacetic acid, diphenylacetic acid, phenoxyacetic acid, benzilic acid, etc.; aromatic dicarboxylic acids such as phthalic acid, naphthalenedicarboxylic acid, biphenyldicarboxylic acid, etc.; and aromatic polycarboxylic acids such as trimesic acid, trimellitic acid, biphenyltetracarboxylic acid, bi-phenylethertetracarboxylic acid, pyromellitic acid, diphenylsulfonetetracarboxylic acid, diphenylethertetracarboxylic acid, diphenylmethanetetracarboxylic acid, diphenylpropanetetracarboxylic acid, and so forth.

The aromatic sulfonic acid is preferably an aromatic sulfonic acid containing about 6–30 carbon atoms, including benzenesulfonic acid, alkyl($C_{1-18}$)benzenesulfonic acid, naphthalenesulfonic acid, alkyl($C_{1-18}$)naphthalenesulfonic acid, G acid, C acid, and so forth.

The aromatic phosphoric ester is preferably an aromatic phosphoric ester containing about 6–30 carbon atoms, including mono- and diesters of phosphoric acid with aromatic ($C_{6-20}$) alcohols.

The alicyclic carboxylic acid is preferably an alicyclic carboxylic acid containing about 7–30 carbon atoms, e.g. alicyclic monocarboxylic acids such as cyclohexanecarboxylic acid, cyclohexanecarboxylic acids mono-, di-, tri-, or tetra-substituted by $C_{1-10}$ alkyl, alkenyl or alkoxyl group (e.g. 4-methylcyclohexanecarboxylic acid, 4-ethylcyclohexanecarboxylic acid, 4-methoxycyclohexanecarboxylic acid, 4-ethoxycyclohexanecarboxylic acid, etc.), tetralincarboxylic acid, tetralincarboxylic acids mono-, di-, tri-, or tetra-substituted by $C_{1-10}$ alkyl, alkenyl or alkoxy group, naphthenic acid, cholic acid, etc.; alicyclic dicarboxylic acids such as cyclohexanedicarboxylic acid, alkyl-substituted cyclohexanedicarboxylic acids, etc.; and alicyclic polycarboxylic acids such as cyclopentanetetracarboxylic acid, cyclohexanetetracarboxylic acid, and so forth.

The alicyclic sulfonic acid is preferably an alicyclic sulfonic acid containing about 6–30 carbon atoms, including cyclohexanesulfonic acid and alkyl($C_{1-8}$)-substituted cyclohexanesulfonic acids, among others.

The alicyclic phosphoric ester is preferably an alicyclic phosphoric ester containing about 6–30 carbon atoms, such as mono- and diesters of phosphoric acid with alicyclic ($C_{6-20}$) alcohols.

The inorganic calcium salt includes calcium hydroxide, calcium silicate, calcium borate, calcium phosphate, calcium nitrate, calcium oxide, calcium carbonate, and calcium sulfate.

Among the various calcium salts mentioned above, calcium salts of aliphatic carboxylic acids of 10–50 carbon atoms, preferably calcium salts of $C_{10-30}$ aliphatic carboxylic acids, particularly calcium stearate, can be used with great advantage.

Calcium stearate is generally used as a neutralizing acceptor for acidic matter, specifically hydrochloric acid, contained in polyolefins, or is used as a lubricant. When this salt is used in combination with the nucleating agent of the invention, not only the above-mentioned effect of calcium stearate but the synergistic effect provided by the present invention can both be implemented substantially without modifying the conventional formulation.

For example, when 0.2 part by weight of the nucleating agent of the present invention and 0.05 part by weight of calcium stearate are combinedly blended with 100 parts by weight of polyolefin resin, the nucleating agent effects are improved as follows. Thus, compared with the case in which the nucleating agent of the invention alone is added to polyolefin resin, particularly polypropylene resin, the haze value is improved from 20% to 15%, the crystallization temperature from 125° C. to 127° C., the flexural modulus from 106 kg/$mm^2$ to 112 kg/$mm^2$, and the gloss value from 100% to 105% (Example 23 and Example 31).

The amount of the calcium salt that can be added is not particularly restricted insofar as the contemplated effects can be produced, but the recommended proportion of the calcium salt relative to 100 parts by weight of polyolefin resin is generally 0.005–0.5 part by weight, preferably 0.01–0.3 part by weight, and more preferably, 0.01–0.1 part by weight. The recommended proportion of the calcium salt relative to 100 parts by weight of the nucleating agent of the present invention is generally 5–200 parts by weight, preferably 10–100 parts by weight, and more preferably, 20–50 parts by weight. If the proportion of the calcium salt is too small or too large, no sufficient synergism will be obtained with the nucleating agent of the invention.

Polyolefin Resin Composition

The polyolefin resin for use in the present invention is a crystalline resin with a crystallinity of 5–100%, preferably 15–95%, and specifically includes polyethylene-based resins, polypropylene-based resins, and polybutene-based resins.

The polyethylene-based resin includes high-density polyethylene, medium-density polyethylene, low-density polyethylene, linear low-density polyethylene, and ethylene co polymers with an ethylene content of not less than 50 weight %.

The polypropylene-based resin includes propylene homopolymer and propylene copolymers with a propylene content of not less than 50 weight %.

The polybutene-based resin includes butene homopolymer and butene copolymers with a butene content of not less than 50 weight %.

All the above-mentioned copolymers may be whichever of random copolymers and block copolymers. The stereoregularity of these resins may be isotactic or syndiotactic.

The comonomers which can be used for the production of the above-mentioned copolymers includes α-olefins such as ethylene, propylene, butene, pentene, hexene, heptene, octene, nonene, decene, undecene, dodecene, etc., bicyclo-type monomers such as 1,4-endomethylenecyclohexene etc., (meth)acrylic acid esters such as methyl (meth)acrylate, ethyl (meth)acrylate, etc., vinyl acetate, and maleic acid.

The catalyst which can be used in the production of such polymers includes not only the radical catalysts and Ziegler-Natta catalysts which are commonly employed in the art, but also a catalyst system comprising a combination of a transition metal compound (e.g. titanium halides such as titanium trichloride, titanium tetrachloride, etc.) as supported by a support such as one based on a magnesium halide, e.g. magnesium chloride, with an alkylaluminum compound (e.g. triethylaluminum, diethylaluminum chloride, etc.), and "metallocene catalysts" each comprising a combination of cyclopentadiene or a derivative thereof with a Group 4 metal such as titanium or zirconium, further with methylalumoxane.

The recommended melt flow rate (hereinafter abbreviated as "MFR"; JIS K 7210-1976) of the polyolefin resins used according to the present invention can be suitably selected according to the molding technology used and the physical properties required of the molded articles and is generally 0.01–200 g/10 minutes and, preferably 0.05–100 g/10 min.

There is no particular limitation on molecular weight distribution (Mw/Mn) but the range of 1–10 is universally employed.

Any known method can be used for the addition of the nucleating agent of the present invention to the polyolefin resin. Thus, it can be directly mixed into the resin, or a master batch prepared beforehand using the resin may be added.

Referring to the method for addition of the calcium salt to the polyolefin resin, the calcium salt may be added independently of the nucleating agent, or may be made into a dry blend with the nucleating agent beforehand, and the blend is incorporated in the resin. In the latter case, the prescribed amounts of the nucleating agent of the invention and the calcium salt can be simultaneously added to the resin in one operation and, in addition to this convenience, the electrostatic charging of the nucleating agent of the invention can be suppressed to thereby facilitate handling.

The resin composition according to the present invention may incorporate known additives for polyolefins unless contrary to the object of the invention.

As such additives for polyolefins, there can be mentioned various additives listed in "The Tables of Positive Lists of Additives", edited by Japan Hygienic Olefin and Styrene Plastic Association (January, 1995), for instance. Specifically, examples thereof include stabilizers (e.g. metal compounds, epoxy compounds, nitrogen compounds, phosphorus compounds, sulfur compounds, etc.), ultraviolet absorbers (e.g. benzophenone series compounds, benzotriazole series compounds, etc.), antioxidants (e.g. phenolic compounds, phosphorous acid esters, sulfur compounds, etc.), surfactants, lubricants (e.g. aliphatic hydrocarbons such as paraffins and waxes, higher fatty acids of 8–22 carbon atoms, $C_{8-22}$ higher fatty acid metal (Al, Ca, Mg, Zn) salts, polyglycol, esters of $C_{4-22}$ higher fatty acids with aliphatic $C_{4-18}$ monohydric alcohols, $C_{8-22}$ higher fatty acid amides, silicone oil, rosin derivatives, etc.), fillers (e.g. talc, hydrotalcite, mica, zeolite, perlite, diatomaceous earth, calcium carbonate, glass fiber, etc.), blowing agents, auxiliary blowing agents, polymer additives, crosslinking agents, crosslinking accelerators, flame retardants, dispersants, processing aids, and so forth.

When the coloration of the molded resin is objectionable, the use of a phosphite-based stabilizer is recommended. Among such stabilizers are trisnonylphenylphosphite, distearylpentaerythritol diphosphite, bis(2,4-di-t-butylphenyl) pentaerythritol diphosphite, bis(2,6-di-t-butyl-4-methylphenyl)pentaerythritol diphosphite, tris(2,4-di-t-butylphenyl)phosphite, tetrakis(2,4-di-t-butylphenyl)-4,4'-biphenylene diphosphite, and so on.

The polyolefin resin composition of the present invention can be produced typically as follows. A mixture of the polyolefin resin and the nucleating agent of the invention, optionally together with said calcium salt and various additives, is agitated by the conventional technique, for example using a Henschel mixer, and then extruded generally at 150° C.–300° C., preferably 170–280° C., and more preferably 180–260° C. into pellets.

Molded Article

The polyolefin composition according to the present invention can be molded by known molding technology, such as injection molding, extrusion molding, blow molding, air-pressure forming, rotational molding, film forming, and so forth.

When molded by any of the above molding processes, the molded article manufactured from the resin composition of the invention is very satisfactory in optical properties such as clarity and gloss and mechanical properties such as rigidity and elastic modulus. For example, a 1 mm-thick molded article obtained from the resin composition (e.g. polypropylene composition) of the invention by injection molding at a molten resin temperature of 240° C. and a mold temperature of 40° C. is superior in clarity and flexural modulus to the corresponding molded article not containing the nucleating agent of the invention (haze value 70%, flexural modulus 85 kg/mm$^2$), and exhibits a haze value of 15% and a flexural modulus of 112 kg/mm$^2$ (see Example 23 and Comparative Example 25).

The recommended molten resin temperature for the production of a molded article from the resin composition of the invention by any of the above processes, as recommended from the standpoint of optical and mechanical properties of products, is generally 150° C.–300° C., preferably 170–280° C., and more preferably 180–260° C. If the molten resin temperature is below 150° C. or higher than 300° C., the clarity, gloss, and flexural modulus tend to be sacrificed.

The nucleating agent of the present invention improves the rate of crystallization and reduces the spherulite size of polyolefins. As a result, the mechanical properties such as Young's modulus and rigidity and optical properties such as clarity and gloss of the molded article are improved. In addition, the breadth of optimum molding conditions can be expanded.

Because of its excellent clarity and mechanical properties and other characteristics, the molded articles according to the invention find application in various fields, typically in the field of food containers, sundry goods, industrial parts, packaging materials, etc., as well as in various other fields.

EXAMPLES

The following examples and comparative examples illustrate the present invention in further detail. The methods used for analysis of the molecular crystal and the criteria used in the evaluation of nucleating characteristics were as follows.

Analysis of the Molecular Crystal (1) Measurement of melting point: Using a differential scanning calorimeter (Shimadzu Corporation, Model "DSC-50"), the endothermic peak temperature of fusion and the heat of fusion were measured over the range of room temperature to 300° C. using a heating rate of 10° C./min.

(2) Infrared spectroscopic analysis: Using an infrared spectrometer (Perkin-Elmer, Model "FT-IR 1720-X"), characteristic absorption bands of the molecular crystal were determined by the KBr diffusion reflection method.

(3) Comparison of crystal forms: Comparison of crystal forms was made using an X-ray diffractometer (Rigaku Denki, Model "RINT-2200").

(4) Determination of alkali metal content: The alkali metal content of the molecular crystal was determined with an atomic absorption and flame emission spectrophotometer (Nippon Jarrell Ash, Model "AA-845").

Criteria for Evaluation of Nucleator Characteristics (1) Evaluation of clarity: by determination of the haze value (JIS K 7105).

(2) Evaluation of gloss: by determination of the gloss value (JIS K 7105).

(3) Evaluation of crystallization temperature: The crystallization temperature (Tc) was measured by DSC. Thus, the sample was held at 240° C. for 5 minutes and then cooled at a cooling rate of 20° C./min. The exothermic peak temperature was regarded as Tc. It is assumed that the higher the Tc value is, the higher the crystallization rate is and the better the moldability is.

(4) Evaluation of rigidity: Using a testpiece 4 mm in thickness, 100 mm in length, and 10 mm in width as prepared by injection molding, the flexural modulus (kg/mm2 or kg/$cm^2$) was measured in accordance with JIS K 7203. The higher the flexural modulus is, the higher the rigidity is.

(5) Evaluation of dispersibility of nucleating agent: A total of 10 injection-molded sheets, 4.0 cm in length, 4.0 cm in width and 1 mm in thickness as prepared by injection molding were visually inspected for evidence of the undispersed nucleating agent. No evidence of the undispersed nucleating agent was rated "o" and the evidence of the undispersed nucleating agent in one or more sheets was rated "x".

Example 1

In 50 ml of ethanol containing 0.7 weight % of water was dissolved 10.0 g of dehydroabietic acid (acid value=187 mg KOH/g) with heating, and 18.7 g of 5 weight % potassium hydroxide/ethanol solution corresponding to a neutralization rate of 50% was added. The mixture was stirred at 40° C. for 30 minutes to carry out a neutralization reaction.

Then, under atmospheric pressure (solution temperature 78° C.), the ethanol was evaporated until immediately before the beginning of crystallization to provide a 60–70 weight % solution, which was then allowed to stand at 60° C. for 24 hours to let crystals separate out. The system was then filtered and the resulting cake was rinsed with ethanol and dried in a vacuum dryer at 80° C. to give white needle-like crystals. This crystal crop was pulverized in a mortar at room temperature to provide 9.5 g (yield 89%) of a nucleating agent comprising potassium salt type 1:1 molecular crystals with a neutralization rate of 50% (melting point 270° C.) (nucleating agent No. 1).

The yield mentioned above is the percentage (%) of real yield relative to theoretical yield. The theoretical yield x1 can be calculated by means of the following equation.

$$x1=a+b-c=10.6\ (g)$$

wherein a: amount of resin acid charged (10.0 g)

b: amount of KOH added for preparation of the nucleating agent (0.935 g)

c: formed water (the number of moles of KOH (0.935/56.1) × molecular weight of water (18) = 0.300 g)

Therefore, the % yield=(real yield (9.5 g)/x1)×100=89 (%)

The potassium content as determined using the atomic absorption and flame emission spectrophotometer agreed with the theoretical value (6.1 weight %). As to acid value, too, the measured value of 87 mg KOH/g was close to the theoretical value (88 mg KOH/g).

Furthermore, even when the above 1:1 molecular crystal was subjected to several cycles of recrystallization from ethanol and filtration under the above-mentioned conditions, the crystal remained unchanged in potassium content and acid value.

The theoretical value of potassium content x2 can be calculated by means of the following equation.

$$x2=(d/e)\times b=0.65\ (g)$$

where d: molecular weight of K (39.1)

e: molecular weight of KOH (56.1)

b: amount of KOH added (0.935 g)

Therefore, the theoretical value of potassium content x3 (%) can be calculated using the following equation.

$$x3=(x2/x1)\times 100=6.1\ (\text{weight }\%)$$

The theoretical amount of KOH x4 necessary to completely neutralize the prepared nucleating agent can be calculated using the following equation.

$$x4=(f\times a)/1000\times b=0.93$$

where f: acid value of starting resin acid (187 mg KOH/g)

Therefore, the theoretical acid value x5 of the prepared nucleating agent can be calculated according to the following equation.

$$x5=x4\times 1000/x1=88\ (\text{mg KOH/g})$$

In DSC analysis, the above potassium salt type 1:1 molecular crystal showed an intrinsic single melting point around 270° C. (heat of fusion: 50–55 J/g). On the other hand, the starting dehydroabietic acid melted at 165–175° C. (heat of fusion: 50–55 J/g) and its potassium salt showed no definite melting point but decomposed at ≧300° C. Moreover, an equimolar blend of dehydroabietic acid and its potassium salt showed a plurality of melting points inclusive of the melting point of the dehydroabietic acid.

In infrared spectroscopic analysis, this molecular crystal showed absorption peaks at wavenumbers (1240 $cm^{-1}$ and 1180 $cm^{-1}$) which are displaced from those at which the dehydroabietic acid, its potassium salt, or an equimolar blend thereof absorbed as shown below, and those absorption peaks were not observed with the starting dehydroabietic acid or its potassium salt. Moreover, the equimolar blend showed C—O stretching vibrations (1280 $cm^{-1}$) due to dehydroabietic acid dimer and O—H out-of-plane deformation vibrations (950 $cm^{-1}$) due to the hydrogen bond of the dimer, whereas the molecular crystal of the invention showed neither of them.

Characteristic absorptions of the 1:1 molecular crystal ($cm^{-1}$):

2930, 1700, 1550, 1500, 1470, 1380, 1240, 1180, 820

Characteristic absorptions of dehydroabietic acid ($cm^{-1}$):

2930, 1700, 1500, 1470, 1380, 1280, 1190, 950, 820

Characteristic absorptions of potassium dehydroabietate ($cm^{-1}$):

2930, 1550, 1500, 1470, 1380, 820

Characteristic absorptions of the 1:1 blend ($cm^{-1}$):

2930, 1700, 1550, 1500, 1470, 1380, 1280, 1190, 950, 820

Comparison of crystal forms by X-ray diffraction analysis revealed that whereas the profile of the blend of dehydroabietic acid and its potassium salt was a mere superposition of the respective profiles of dehydroabietic acid and its potassium salt, the molecular crystal showed an intrinsic diffraction profile. Particularly, the peak at 2θ=4.6 deg. as observed with the equimolar blend had disappeared and new peaks with a relative intensity ratio of 2:1 were found at 2θ=4.0 deg. and 2θ=5.0 deg. on the small angle area suggesting a difference in crystal form between the equimolar blend and the 1:1 molecular crystal.

Example 2

In 50 ml of ethanol containing 1 weight % of water was dissolved 10.0 g of dehydroabietic acid (acid value=187 mg KOH/g) with heating and 9.4 g of 5 weight % potassium hydroxide/ethanol solution corresponding to a neutralization rate of 25% was added. The mixture was stirred at 40° C. for 30 minutes to carry out a neutralization reaction.

Under atmospheric pressure (solution temperature 78° C.), the ethanol was evaporated until immediately before the beginning of crystallization to prepare a 60–70 weight % solution, which was then allowed to stand at 60° C. for 24 hours to let crystals separate out, followed by filtration. The resulting cake was rinsed with ethanol and dried in a vacuum dryer at 80° C. to give white needles. This crystal crop was pulverized in a mortar at room temperature to provide 9.0 g (yield 87%) (m.p. 220° C.) of a nucleating agent comprising potassium salt type 3:1 molecular crystals with a neutralization rate of 25% (nucleating agent No. 2).

The potassium content determined using said atomic absorption and flame emission spectrophotometer was 3.1 which represented a close approximation of the theoretical value (3.2 weight %). The acid value of 135 mg KOH/g was also close to the theoretical value (136 mg KOH/g).

When this 3:1 molecular crystal was subjected to several cycles of recrystallization from ethanol and filtration under the same conditions as above, the crystal remained unchanged in potassium content and acid value.

In DSC analysis, the potassium salt type 3:1 molecular crystal showed an intrinsic single melting point around 220° C. (heat of fusion: 50–55 J/g).

In infrared spectroscopic analysis, this molecular crystal absorbed at wavenumbers (1240 $cm^{-1}$ and 1180 $cm^{-1}$) which were displaced from those at which the dehydroabietic acid, its potassium salt, or a blend thereof (molar ratio 3:1) absorbed as shown below. Those absorption peaks were not observed with the starting dehydroabietic acid or its potassium salt. Moreover, whereas the above blend showed O—H out-of-plane deformation vibrations (950 $cm^{-1}$) due to the hydrogen bond of dehydroabietic acid dimer, the molecular crystal did not show the vibrations.

Characteristic absorptions of the 3:1 molecular crystal ($cm^{-1}$):

2930, 1700, 1550, 1500, 1470, 1380, 1280, 1240, 1180, 820

Characteristic absorptions of dehydroabietic acid ($cm^{-1}$):

2930, 1700, 1500, 1470, 1380, 1280, 1190, 950, 820

Characteristic absorptions of potassium dehydroabietate ($cm^{-1}$):

2930, 1550, 1500, 1470, 1380, 820

Characteristic absorptions of the 3:1 blend ($cm^{-1}$):

2930, 1700, 1550, 1500, 1470, 1380, 1280, 1190, 950, 820

Comparison of crystal forms by X-ray diffraction analysis revealed that whereas the profile of the blend of dehydroabietic acid and its potassium salt (molar ratio 3:1) was a mere superposition of the respective profiles of dehydroabietic acid and its metal salt, this molecular crystal showed an intrinsic profile. Particularly, the peak at 2θ=4.6 deg. as observed with the blend had disappeared and, instead, new peaks with a relative intensity ratio of 3:2 appeared at 2θ=4.7 and 5.1 deg., suggesting a difference in crystal form between said blend and the 3:1 molecular crystal.

Example 3

In 50 ml of ethanol containing 1 weight % of water was dissolved 10.0 g of dehydroabietic acid (acid value=187 mg KOH/g) with heating and 13.1 g of 5 weight % potassium hydroxide/ethanol solution corresponding to a neutralization rate of 35% was added. The mixture was stirred at 40° C. for 30 minutes to carry out a neutralization reaction.

Under atmospheric pressure (solution temperature 78° C.), the ethanol was evaporated until immediately before the beginning of crystallization to prepare a 60–70 weight % solution, which was then allowed to stand at 60° C. for 24 hours to let crystals separate out, followed by filtration. The resulting cake was rinsed with ethanol and dried in a vacuum dryer at 80° C. to give white needles. This crystal crop was pulverized in a mortar at room temperature to provide 9.2 g (yield 88%) of a nucleating agent composed of potassium salt type 3:1 and 1:1 molecular crystals (m.p. 220° C. and 260° C.) with a neutralization rate of 35% (nucleating agent No. 3).

The potassium content determined using said atomic absorption and flame emission spectrophotometer was 4.3 which represented a close approximation of the theoretical value (4.4 weight %). The acid value of 115 mg KOH/g was also close to the theoretical value (116 mg KOH/g).

When this molecular crystal was subjected to several cycles of recrystallization from ethanol and filtration under the same conditions as above, the crystal remained unchanged in potassium content and acid value.

In DSC analysis, the above molecular crystal showed two endothermic peaks corresponding to the 3:1 molecular crystal and the 1:1 molecular crystal, respectively, in the neighborhood of 220° C. (heat of fusion: ca 30 J/g) and in the neighborhood of 260° C. (heat of fusion: ca 20 J/g). The heat-of-fusion ratio of 30/20 indicated that the product was a mixture of molecular crystals with a 3:1/1:1 ratio of about 3/2.

Example 4

In 50 ml of ethanol containing 1 weight % of water was dissolved 10.0 g of dehydroabietic acid (acid value=187 mg KOH/g) with heating and 13.3 g of 5 weight % sodium hydroxide/ethanol solution corresponding to a neutralization rate of 50% was added. The mixture was stirred at 40° C. for 30 minutes to carry out a neutralization reaction.

Under atmospheric pressure (solution temperature 78° C.), the ethanol was evaporated until immediately before the beginning of crystallization to prepare a 60–70 weight t solution, which was then allowed to stand at 60° C. for 24 hours to let crystals separate out, followed by filtration. The resulting cake was rinsed with ethanol and dried in a vacuum dryer at 80° C. to give white needles. This crystal crop was pulverized in a mortar at room temperature to provide 9.4 g (yield 91%) (m.p. 220° C.) of a nucleating agent comprising sodium salt type 1:1 molecular crystals with a neutralization rate of 50% (nucleating agent No. 4).

The sodium content determined using said atomic absorption and flame emission spectrophotometer was 3.8 representing a close approximation of the theoretical value (3.7 weight %). The acid value of 89 mg KOH/g was also close to the theoretical value (90.2 mg KOH/g).

When this 1:1 molecular crystal was subjected to several cycles of recrystallization from ethanol and filtration under the same conditions as above, the crystal remained unchanged in sodium content and acid value.

In DSC analysis, the above sodium salt type 1:1 molecular crystal showed an intrinsic single melting point around 220° C. (heat of fusion: 40–50 J/g). On the other hand, the starting dehydroabietic acid has a melting point of 165–175° C. (heat of fusion: 50–55 J/g) and its sodium salt showed no definite melting point but decomposed at ≧300° C. An equimolar blend of dehydroabietic acid and its sodium salt showed a plurality of melting points inclusive of the melting point of the dehydroabietic acid.

Example 5

In 50 ml of ethanol containing 1 weight % of water was dissolved 10.0 g of dehydroabietic acid (acid value=187 mg KOH/g) with heating, and 6.7 g of 5 weight % sodium hydroxide/ethanol solution corresponding to a neutralization rate of 25% was added. The mixture was stirred at 40° C. for 30 minutes to carry out a neutralization reaction.

Under atmospheric pressure (solution temperature 78° C.), the ethanol was evaporated until immediately before the beginning of crystallization to prepare a 60–70 weight % solution, which was then allowed to stand at 60° C. for 24 hours to let crystals separate out, followed by filtration. The resulting cake was rinsed with ethanol and dried in a vacuum dryer at 80° C. to give white needles. This crystal crop was pulverized in a mortar at room temperature to provide 9.2 g (yield 90%) (m.p. 200° C.) of a nucleating agent comprising sodium salt type 3:1 molecular crystals with a neutralization rate of 25% (nucleating agent No. 5).

The sodium content of the above crystal was 2.0 representing a close approximation of the theoretical value (1.9 weight %). The acid value of 137 mg KOH/g was also close to the theoretical value (138 mg KOH/g). When this 3:1 molecular crystal was subjected to several cycles of recrystallization from ethanol and filtration under the same conditions as above, the crystal remained unchanged in sodium content and acid value.

In DSC analysis, this sodium salt type 3:1 molecular crystal showed an intrinsic single melting point around 200° C. (heat of fusion: 40–50 J/g). The 3:1 (mole) blend of dehydroabietic acid and its sodium salt showed a plurality of melting points inclusive of the melting point of the dehydroabietic acid.

Example 6

In 50 ml of ethanol containing 1 weight % of water was dissolved 10.0 g of dehydroabietic acid (acid value=187 mg KOH/g) with heating and 8.0 g of 5 weight % lithium hydroxide/ethanol solution corresponding to a neutralization rate of 50% was added. The mixture was stirred at 40° C. for 30 minutes to carry out a neutralization reaction.

Under atmospheric pressure (solution temperature 78° C.), the ethanol was evaporated until immediately before the beginning of crystallization to prepare a 60–70 weight % solution, which was then allowed to stand at 60° C. for 24 hours to let crystals separate out, followed by filtration. The resulting cake was rinsed with ethanol and dried in a vacuum dryer at 80° C. to give white needles. This crystal crop was pulverized in a mortar at room temperature to provide 8.8 g (yield 87%) (m.p. 200° C.) of a nucleating agent comprising lithium salt type 1:1 molecular crystals with a neutralization rate of 50% (nucleating agent No. 6).

In DSC analysis, the lithium salt type 1:1 molecular crystal showed an intrinsic single melting point around 200° C. (heat of fusion: 40–50 J/g). On the other hand, an equimolar blend of dehydroabietic acid and its lithium salt showed a plurality of melting points inclusive of the melting point of the dehydroabietic acid.

Example 7

In 50 ml of ethanol containing 1 weight % of water was dissolved 10.0 g of dehydroabietic acid (acid value=187 mg KOH/g) with heating, and 4.0 g of 5 weight % lithium hydroxide/ethanol solution corresponding to a neutralization rate of 25% was added. The mixture was stirred at 40° C. for 30 minutes to carry out a neutralization reaction.

Under atmospheric pressure (solution temperature 78° C.), the ethanol was evaporated until immediately before the beginning of crystallization to prepare a 60–70 weight % solution, which was then allowed to stand at 60° C. for 24 hours to let crystals separate out, followed by filtration. The resulting cake was rinsed with ethanol and dried in a vacuum dryer at 80° C. to give white needles. This crystal crop was pulverized in a mortar at room temperature to provide 8.8 g (yield 88%) (m.p. 190° C.) of a nucleating agent comprising lithium salt type 3:1 molecular crystals with a neutralization rate of 25% (nucleating agent No. 7).

In DSC analysis, the above lithium salt type 3:1 molecular crystal showed an intrinsic single melting point around 190° C. (heat of fusion: 40–50 J/g). On the other hand, a 3:1 (mole) blend of dehydroabietic acid and its lithium salt showed a plurality of melting points inclusive of the melting point of the dehydroabietic acid.

Example 8

In 50 ml of ethanol containing 1 weight % of water was dissolved 10.0 g of a rosin-based resin acid composed of 75 weight % of dehydroabietic acid, 19 weight % of dihydroabietic acid, 3 weight % of tetrahydroabietic acid and 3 weight % of an unidentified resin acid fraction (acid value 186 mg KOH/g) with heating, and 18.6 g of 5 weight % potassium hydroxide/ethanol solution corresponding to a neutralization rate of 50% was added. The mixture was stirred at 40° C. for 30 minutes to carry out a neutralization reaction.

Under atmospheric pressure (solution temperature 78° C.), the ethanol was evaporated until immediately before the beginning of crystallization to prepare a 60–70 weight % solution, which was then allowed to stand at 60° C. for 24 hours to let crystals separate out, followed by filtration. The resulting cake was rinsed with ethanol and dried in a vacuum dryer at 80° C. to give white needles. This crystal crop was pulverized in a mortar at room temperature to provide 8.9 g (yield 84%) (m.p. 240° C.) of a nucleating agent comprising potassium salt type 1:1 molecular crystals with a neutralization rate of 50% (nucleating agent No. 8).

The measured potassium content of the above crystal was 6.0 weight % representing a close approximation of the theoretical value (6.1 weight %). The measured acid value of 88.0 mg KOH/g was also very close to the theoretical value (87.5 mg KOH/g). When this 1:1 molecular crystal was subjected to several cycles of recrystallization from ethanol and filtration under the same conditions as above, the crystal remained unchanged in potassium content and acid value.

In DSC, the above molecular crystal showed an endothermic peak characteristic of the 1:1 molecular crystal around 240° C. (heat of fusion: ca 40–45 J/g).

In infrared spectroscopic analysis, this molecular crystal absorbed at wavenumbers (1240 $cm^{-1}$ and 1180 $cm^{-1}$) which were displaced from those at which the rosin-based resin acid, its potassium salt, and an equimolar blend of them absorbed as shown below. Those absorptions were not observed with the starting rosin-based resin acid or its potassium salt. Moreover, whereas an equimolar blend showed C—O stretching vibrations (1280 $cm^{-1}$) due to rosin-based resin acid dimer and O—H out-of-plane deformation vibrations (950 $cm^{-1}$) due to the hydrogen bond of the dimer, the molecular crystal of the invention showed neither of them.

Characteristic absorptions of the 1:1 molecular crystal ($cm^{-1}$):

2930, 1700, 1550, 1500, 1465, 1385, 1240, 1180, 820

Characteristic absorptions of dehydroabietic acid ($cm^{-1}$): 2930, 1700, 1500, 1465, 1385, 1280, 1190, 950, 820

Characteristic absorptions of potassium dehydroabietate ($cm^{-1}$):

2930, 1550, 1500, 1465, 1385, 820

Characteristic absorptions of the 1:1 blend ($cm^{-1}$):

2930, 1700, 1550, 1500, 1465, 1385, 1280, 1190, 950, 820

Comparison of crystal forms by X-ray diffraction analysis (FIG. 1) revealed that whereas the diffraction profile of the equimolar blend of the rosin-based resin acid and its potassium salt was a superposition of the respective profiles of the rosin-based resin acid and its potassium salt, this molecular crystal showed an intrinsic diffraction profile. Particularly, the peak at 2θ=4.6 deg. as observed with the equimolar blend had disappeared and, instead, new peaks with relative intensities of 42, 22, 11 and 9 appeared at 2θ=4.1, 5.1, 6.9 and 8.3 deg., respectively, on the small angle area, suggesting a difference in crystal form between said blend and the 1:1 molecular crystal.

Example 9

In 50 ml of ethanol containing 1 weight % of water was dissolved 10.0 g of a rosin-based resin acid composed of 75 weight % of dehydroabietic acid, 19 weight % of dihydroabietic acid, 3 weight % of tetrahydroabietic acid, and 3 weight % of an unidentified resin acid fraction (acid value 186 mg KOH/g) with heating, and 9.3 g of 5 weight % potassium hydroxide/ethanol solution corresponding to a neutralization rate of 25% was added. The mixture was stirred at 40° C. for 30 minutes to carry out a neutralization reaction.

Under atmospheric pressure (solution temperature 78° C.), the ethanol was evaporated until immediately before the beginning of crystallization to prepare a 60–70 weight % solution, which was then allowed to stand at 60° C. for 24 hours to let crystals separate out, followed by filtration. The resulting cake was rinsed with ethanol and dried in a vacuum dryer at 80° C. to give white needles. This crystal crop was pulverized in a mortar at room temperature to provide 8.9 g (yield 86%) (m.p. 200° C.) of a nucleating agent comprising potassium salt type 3:1 molecular crystals with a neutralization rate of 25% (nucleating agent No. 9).

The potassium content of the crystal was 3.2 weight % representing a close approximation of the theoretical value (3.1 weight %). The acid value of 134 mg KOH/g was also close to the theoretical value (135 mg KOH/g). When this 3:1 molecular crystal was subjected to several cycles of recrystallization from ethanol and filtration under the same conditions as above, the crystal remained unchanged in potassium content and acid value.

In DSC, the above molecular crystal showed an endothermic peak characteristic of the 3:1 molecular crystal around 200° C. (heat of fusion: ca 40–45 J/g).

In infrared spectroscopic analysis, this molecular crystal absorbed at wavenumbers (1240 $cm^{-1}$ and 1180 $cm^{-1}$) which were displaced from those at which the rosin-based resin acid, its potassium salt, or a blend thereof (molar ratio 3:1) absorbed as shown below. Moreover, whereas said blend showed O—H out-of-plane deformation vibrations (950 $cm^{-1}$) due to the hydrogen bond of the rosin-based resin acid dimer, the molecular crystal did not show the vibrations.

Characteristic absorptions of the 3:1 molecular crystal ($cm^{-1}$):

2930, 1700, 1550, 1500, 1465, 1385, 1280, 1240, 1180, 820

Characteristic absorptions of dehydroabietic acid ($cm^{-1}$):

2930, 1700, 1500, 1465, 1385, 1280, 1190, 950, 820

Characteristic absorptions of potassium dehydroabietate ($cm^{-1}$):

2930, 1550, 1500, 1465, 1385, 820

Characteristic absorptions of the 3:1 blend ($cm^{-1}$):

2930, 1700, 1550, 1500, 1465, 1385, 1280, 1190, 950, 820

Comparison of crystal forms by X-ray diffraction analysis (FIG. 1) revealed that whereas the diffraction profile of the blend of the rosin-based resin acid and its potassium salt (molar ratio 3:1) was a mere superposition of the respective profiles of the rosin-based resin acid and its potassium salt, this molecular crystal showed an intrinsic profile. Particularly, the peak at 2θ=4.6 deg. as observed with the blend had disappeared and, instead, new peaks with relative intensities of 54, 36, 13, 8, 11 and 13 appeared at 2θ=4.7, 5.1, 5.5, 5.7, 6.8 and 7.7 deg., respectively, suggesting a difference in crystal form between said blend and the 3:1 molecular crystal.

Example 10

In 50 ml of ethanol containing 1 weight % of water was dissolved 10.0 g of a rosin-based resin acid composed of 75 weight % of dehydroabietic acid, 19 weight % of dihydroabietic acid, 3 weight % of tetrahydroabietic acid, and 3 weight % of an unidentified resin acid fraction (acid value 186 mg KOH/g) with heating, and 13.0 g of 5 weight % potassium hydroxide/ethanol solution corresponding to a neutralization rate of 35% was added.. The mixture was stirred at 40° C. for 30 minutes to carry out a neutralization reaction.

Under atmospheric pressure (solution temperature 78° C.), the ethanol was evaporated until immediately before the beginning of crystallization to prepare a 60–70 weight % solution, which was then allowed to stand at 60° C. for 24 hours to let crystals separate out, followed by filtration. The resulting cake was rinsed with ethanol and dried in a vacuum dryer at 80° C. to give white needles. This crystal crop was pulverized in a mortar at room temperature to provide 8.9 g (yield. 85%) of a nucleating agent comprising potassium salt type 3:1 molecular crystals with a neutralization rate of 35% (nucleating agent No. 10).

The measured potassium content of the crystal was 4.3 weight % representing a close approximation of the theoretical value (4.4 weight %). The measured acid value of 117 mg KOH/g was also close to the theoretical value (116 mg KOH/g). When this molecular crystal was subjected to several cycles of recrystallization from ethanol and filtration under the same conditions as above, the crystal remained unchanged in potassium content and acid value.

In DSC analysis, the above molecular crystal showed two endothermic peaks corresponding to the 3:1 molecular crystal and the 1:1 molecular crystal, respectively, in the neighborhood of 190° C. (heat of fusion: ca 25 J/g) and in the neighborhood of 240° C. (heat of fusion: ca 17 J/g). The heat-of-fusion ratio of 25/17 indicated that the product was a mixture of molecular crystals with a 3:1/1:1 ratio of about 3/2.

Example 11

In 50 ml of ethanol containing 1 weight % of water was dissolved 10.0 g of a rosin-based resin acid composed of 75 weight % of dehydroabietic acid, 19 weight % of dihydroabietic acid, 3 weight % of tetrahydroabietic acid, and 3 weight % of an unidentified resin acid fraction (acid value 186 mg KOH/g) with heating, and 13.3 g of 5 weight % sodium hydroxide/ethanol solution corresponding to a neutralization rate of 50% was added. The mixture was stirred at 40° C. for 30 minutes to carry out a neutralization reaction.

Under atmospheric pressure (solution temperature 78° C.), the ethanol was evaporated until immediately before the beginning of crystallization to prepare a 60–70 weight % solution, which was then allowed to stand at 60° C. for 24 hours to let crystals separate out, followed by filtration. The resulting cake was rinsed with ethanol and dried in a vacuum dryer at 80° C. to give white needles. This crystal crop was pulverized in a mortar at room temperature to provide 9.2 g (yield 89%) (m.p. 210° C.) of a nucleating agent comprising sodium salt type 1:1 molecular crystals with a neutralization rate of 50% (nucleating agent No. 11). The measured sodium content of the crystal was 3.6 weight % representing a close approximation of the theoretical value (3.7 weight %). The measured acid value of 90.0 mg KOH/g was also close to the theoretical value (89.7 mg KOH/g). When this 1:1 molecular crystal was subjected to several cycles of recrystallization from ethanol and filtration under the same conditions as above, the crystal remained unchanged in sodium content and acid value.

In DSC, the above molecular crystal showed an endothermic peak characteristic of the 1:1 molecular crystal around 210° C. (heat of fusion: ca 40–50 J/g).

Example 12

In 50 ml of ethanol containing 1 weight % of water was dissolved 10.0 g of a rosin-based resin acid composed of 75 weight % of dehydroabietic acid, 19 weight % of dihydroabietic acid, 3 weight % of tetrahydroabietic acid, and 3 weight % of an unidentified resin acid fraction (acid value 186 mg KOH/g) with heating, and 6.6 g of 5 weight % sodium hydroxide/ethanol solution corresponding to a neutralization rate of 25% was added. The mixture was stirred at 40° C. for 30 minutes to carry out a neutralization reaction.

Under atmospheric pressure (solution temperature 78° C.), the ethanol was evaporated until immediately before the beginning of crystallization to prepare a 60–70 weight % solution, which was then allowed to stand at 60° C. for 24 hours to let crystals separate out, followed by filtration. The resulting cake was rinsed with ethanol and dried in a vacuum dryer at 80° C. to give white needles. This crystal crop was pulverized in a mortar at room temperature to provide 9.0 g (yield 88%) (m.p. 190° C.) of a nucleating agent comprising sodium salt type 3:1 molecular crystals with a neutralization rate of 25% (nucleating agent No. 12). The sodium content determined was in agreement with the theoretical value (1.9 weight %). The measured acid value of 136 mg KOH/g was close to the theoretical value (137 mg KOH/g). When this 3:1 molecular crystal was subjected to several cycles of recrystallization from ethanol and filtration under the same conditions as above, the crystal remained unchanged in sodium content and acid value.

In DSC, the above molecular crystal showed an endothermic peak characteristic of the 3:1 molecular crystal around 190° C. (heat of fusion: ca 40–50 J/g).

Example 13

In 50 ml of ethanol containing 1 weight % of water was dissolved with heating 10.0 g of a rosin (acid value 168 mg KOH/g) composed of 68 weight % of dehydroabietic acid, 17 weight % of dihydroabietic acid, 3 weight % of tetrahydroabietic acid, 2 weight % of unidentified resin acid fraction and 10 weight % of a neutral substance fraction which would not take part in the formation of molecular crystals, and 16.8 g of 5 weight % potassium hydroxide/ethanol solution corresponding to a neutralization rate of 50% was added. The mixture was stirred at 40° C. for 30 minutes to carry out a neutralization reaction.

Under atmospheric pressure (solution temperature 78° C.), the ethanol was evaporated until immediately before the beginning of crystallization to prepare a 60–70 weight % solution, which was then allowed to stand at 60° C. for 24 hours to let crystals separate out, followed by filtration. The resulting cake was rinsed with ethanol and dried in a vacuum dryer at 80° C. to give white needles. This crystal crop was pulverized in a mortar at room temperature to provide 7.5 g of a nucleating agent comprising potassium salt type 1:1 molecular crystals with a neutralization rate of 50% (nucleating agent No. 13).

In DSC, the above molecular crystal showed an endothermic peak characteristic of the 1:1 molecular crystal around 240° C. (heat of fusion: ca 40–45 J/g).

Example 14

In 50 ml of ethanol containing 1 weight % of water was dissolved with heating 10.0 g of a rosin (acid value 168 mg KOH/g) composed of 68 weight % of dehydroabietic acid, 17 weight % of dihydroabietic acid, 3 weight % of tetrahydroabietic acid, 2 weight % of unidentified resin acid fraction and 10 weight % of a neutral substance fraction which would not take part in. the formation of molecular crystals, and 8.4 g of 5 weight % potassium hydroxide/ethanol solution corresponding to a neutralization rate of 25% was added. The mixture was stirred at 40° C. for 30 minutes to carry out a neutralization reaction.

Under atmospheric pressure (solution temperature 78° C.), the ethanol was evaporated until immediately before the beginning of crystallization to prepare a 60–70 weight % solution, which was then allowed to stand at 60° C. for 24 hours to let crystals separate out, followed by filtration. The resulting cake was rinsed with ethanol and dried in a vacuum dryer at 80° C. to give white needles. This crystal crop was pulverized in a mortar at room temperature to provide 7.3 g (yield 71%) of a nucleating agent comprising potassium salt type 3:1 molecular crystals with a neutralization rate of 25% (nucleating agent No. 14).

In DSC, the above molecular crystal showed an endothermic peak characteristic of the 3:1 molecular crystal around 200° C. (heat of fusion: ca 40–45 J/g).

Example 15

In 50 ml of ethanol containing 1 weight % of water was dissolved with heating 10.0 g of a rosin (acid value 168 mg KOH/g) composed of 68 weight % of dehydroabietic acid, 17 weight % of dihydroabietic acid, 3 weight % of tetrahydroabietic acid, 2 weight % of unidentified resin acid fraction, and 10 weight % of a neutral substance fraction which would not take part in the formation of molecular crystals, and 11.8 g of 5 weight % potassium hydroxide/ethanol solution corresponding to a neutralization rate of 35% was added. The mixture was stirred at 40° C. for 30 minutes to carry out a neutralization reaction.

Under atmospheric pressure (solution temperature 78° C.), the ethanol was evaporated until immediately before the beginning of crystallization to prepare a 60–70 weight % solution, which was then allowed to stand at 60° C. for 24 hours to let crystals separate out, followed by filtration. The resulting cake was rinsed with ethanol and dried in a vacuum dryer at 80° C. to give white needles. This crystal crop was pulverized in a mortar at room temperature to provide 7.6 g of a nucleating agent comprising potassium salt type 3:1 and 1:1 molecular crystals with a neutralization rate of 35% (nucleating agent No. 15).

In DSC analysis, the above molecular crystal showed two endothermic peaks corresponding to the 3:1 molecular crystal and the 1:1 molecular crystal, respectively, in the neighborhood of 190° C. (heat of fusion: ca 25 J/g) and in the neighborhood of 230° C. (heat of fusion: ca 16 J/g). The heat-of-fusion ratio of 25/16 indicated that the product was a mixture of molecular crystals with a 3:1/1:1 ratio of about 3/2.

Comparative Example 1

The same rosin-based resin acid with a dehydroabietic acid content of 75 weight % as used in Example 8 was used as a nucleating agent (nucleating agent No. 16).

Comparative Example 2

Except that the neutralization reaction was carried out at a neutralization rate of 100%, the procedure of Example 8 was otherwise repeated to provide a rosin-based resin acid potassium salt (nucleating agent No. 17).

Comparative Example 3

Except that the neutralization reaction was carried out using sodium hydroxide at a neutralization rate of 100%, the procedure of Example 8 was otherwise repeated to provide a rosin-based resin acid sodium salt (nucleating agent No. 18).

Comparative Example 4

Except that the neutralization reaction was carried out using lithium hydroxide at a neutralization rate of 100%, the procedure of Example 8 was otherwise repeated to provide a rosin-based resin acid lithium salt (nucleating agent No. 19).

Comparative Example 5

The nucleating agents No. 16 and No. 17 were dry-blended in an equimolar ratio at room temperature to provide a nucleating agent blend not containing the potassium salt type 1:1 molecular crystal (a neutralization rate of 50%) (nucleating agent No. 20).

As used in this and subsequent comparative examples, the term “neutralization rate” for dry blends means the molar percentage (%) of neutralized carboxyl groups (in Comparative Example 5, —COOK) relative to all carboxyl groups (—COOH and —COOK in Example 5) in the nucleating agent blend.

Comparative Example 6

The nucleating agent No. 16 and nucleating agent No. 17 were dry-blended in a ratio of 3:1 at room temperature (neutralization rate: 25%) to provide a nucleating agent blend not containing the potassium salt type 3:1 molecular crystal (nucleating agent No. 21).

Comparative Example 7

The nucleating agent No. 16 and nucleating agent No. 18 were dry-blended in an equimolar ratio at room temperature (neutralization rate: 50%) to provide a nucleating agent blend not containing the sodium salt type 1:1 molecular crystal (nucleating agent No. 22).

Comparative Example 8

The nucleating agent No. 16 and nucleating agent No. 18 were dry-blended in a ratio of 3:1 (neutralization rate: 25%) to provide a nucleating agent blend not containing the sodium salt type 3:1 molecular crystal (nucleating agent No. 23).

Comparative Example 9

In 10 ml of xylene was dissolved 10.0 g of a rosin-based resin acid (acid value 186 mg KOH/g) composed of 75 weight % dehydroabietic acid, 19 weight % dihydroabietic acid, 3 weight % of tetrahydroabietic acid and 3 weight % of an unidentified resin acid fraction with heating, and 0.93 g of potassium hydroxide corresponding to a neutralization rate of 50 mole % was added. The mixture was stirred at 60° C. for 30 minutes to carry out a neutralization reaction.

Then, 50 ml of water was added and the xylene and water were removed from the system by steam distillation under reduced pressure. Furthermore, in order to eliminate the xylene odor, 50 ml of water was further added and the xylene and water within the system were removed again by steam distillation under reduced pressure to provide a wet sample. This sample was thoroughly dried in a vacuum dryer at room temperature, and the resulting glass-like substance was pulverized in a mortar at room temperature to provide a rosin-based nucleating agent (nucleating agent No. 24).

When this nucleating agent was subjected to DSC determination and X-ray diffraction analysis, neither a definite melting point nor a definite diffraction profile was observed. When it was subjected to FT-IR analysis, substantially the same result as in Comparative Example 5 was obtained, indicating that this product was an equimolar mixture of dehydroabietic acid and its potassium salt.

Comparative Example 10

In 10 ml of xylene was dissolved 10.0 g of a rosin-based resin acid (acid value 186 mg KOH/g) composed of 75 weight % of dehydroabietic acid, 19 weight % of dihydroabietic acid, 3 weight % of tetrahydroabietic acid and 3 weight % of an unidentified resin acid fraction with heating, and 0.47 g of potassium hydroxide corresponding to a neutralization rate of 25 mole % was added. The mixture was stirred at 60° C. for 30 minutes to carry out a neutralization reaction.

Then, 50 ml of water was added and the xylene and water were removed from the system by steam distillation under reduced pressure. Furthermore, in order to eliminate the xylene odor, 50 ml of water was further added and the xylene and water in the system were removed again by steam distillation under reduced pressure to provide a wet sample. This sample was thoroughly dried in a vacuum dryer at room temperature and the resulting glass-like substance was pulverized in a mortar at room temperature to provide a rosin-based nucleating agent (nucleating agent No. 25).

When this nucleating agent was subjected to DSC determination and X-ray diffraction analysis, neither a definite melting point nor a definite diffraction profile was observed. When it was subjected to FT-IR analysis,. substantially the same result as in Comparative Example 6 was obtained, indicating that this product was a 3:1 (molar ratio) mixture of dehydroabietic acid and its potassium salt.

Comparative Example 11

In 50 ml of methyl ethyl ketone containing 50 weight % of water was dissolved 10.0 g of a rosin-based resin acid (acid value 186 mg KOH/g) composed of 75 weight % of dehydroabietic acid, 19 weight % of dihydroabietic acid, 3 weight % of tetrahydroabietic acid, and 3 weight % of an unidentified resin acid fraction with heating, and 0.66 g of sodium hydroxide corresponding to a neutralization rate of 50 mole % was added. The mixture was stirred at 60° C. for 30 minutes to carry out a neutralization reaction.

Then, the methyl ethyl ketone and water were removed under reduced pressure. Furthermore, in order to eliminate the ketone odor, 50 ml of water was added and the methyl ethyl ketone and water in the system were removed by steam distillation under reduced pressure to provide a wet sample. This sample was thoroughly dried in a vacuum dryer at room temperature and the resulting glass-like substance was pulverized in a mortar at room temperature to provide a rosin-based nucleating agent (nucleating agent No. 26).

When this nucleating agent was subjected to DSC determination, no definite melting point was observed. When it was subjected to FT-IR analysis, substantially the same result as in Comparative Example 7 was obtained, indicating that this product was an equimolar mixture of dehydroabietic acid and its sodium salt.

Comparative Example 12

In 50 ml of methyl ethyl ketone containing 50 weight % of water was dissolved 10.0 g of dehydroabietic acid (acid value 187 mg KOH/g) with heating, and 0.33 g of sodium hydroxide corresponding to a neutralization rate of 25 mole % was added. The mixture was stirred at 60° C. for 30 minutes to carry out a neutralization reaction.

Then, the methyl ethyl ketone and water were removed under reduced pressure. Furthermore, in order to eliminate the ketone odor, 50 ml of water was added and the methyl ethyl ketone and water in the system were removed by steam distillation under reduced pressure to provide a wet sample. This sample was thoroughly dried in a vacuum dryer at room temperature and the resulting glass-like substance was pulverized in a mortar at room temperature to provide a rosin-based nucleating agent (nucleating agent No. 27).

When this nucleating agent was subjected to DSC determination, no definite melting point was observed. When it was subjected to FT-IR analysis, substantially the same result as in Comparative Example 8 was obtained, indicating that this product was a 3:1 (mole) mixture of dehydroabietic acid and its sodium salt.

TABLE 1

| | Nucleating agent No. | Dehydroabietic acid content (%) | Metal species | Neutralization rate (%) | 1:1 Molecular crystal content (%) | 3:1 Molecular crystal content (%) |
|---|---|---|---|---|---|---|
| Example 1 | 1 | 100 | K | 50 | 100 | 0 |
| 2 | 2 | 100 | K | 25 | 0 | 100 |
| 3 | 3 | 100 | K | 35 | 40 | 60 |
| 4 | 4 | 100 | Na | 50 | 100 | 0 |
| 5 | 5 | 100 | Na | 25 | 0 | 100 |
| 6 | 6 | 100 | Li | 50 | 100 | 0 |
| 7 | 7 | 100 | Li | 25 | 0 | 100 |
| 8 | 8 | 75 | K | 50 | 100 | 0 |
| 9 | 9 | 75 | K | 25 | 0 | 100 |

TABLE 1-continued

| | Nucleating agent No. | Dehydroabietic acid content (%) | Metal species | Neutralization rate (%) | 1:1 Molecular crystal content (%) | 3:1 Molecular crystal content (%) |
|---|---|---|---|---|---|---|
| 10 | 10 | 75 | K | 35 | 40 | 60 |
| 11 | 11 | 75 | Na | 50 | 100 | 0 |
| 12 | 12 | 75 | Na | 25 | 0 | 100 |
| 13 | 13 | 68 | K | 50 | 100 | 0 |
| 14 | 14 | 68 | K | 25 | 0 | 100 |
| 15 | 15 | 68 | K | 35 | 40 | 60 |
| Comparative | | | | | | |
| Example 1 | 16 | 75 | — | 0 | 0 | 0 |
| 2 | 17 | 75 | K | 100 | 0 | 0 |
| 3 | 18 | 75 | Na | 100 | 0 | 0 |
| 4 | 19 | 75 | Li | 100 | 0 | 0 |
| 5 | 20 | 75 | K | 50 | 0 | 0 |
| 6 | 21 | 75 | K | 25 | 0 | 0 |
| 7 | 22 | 75 | Na | 50 | 0 | 0 |
| 8 | 23 | 75 | Na | 25 | 0 | 0 |
| 9 | 24 | 75 | K | 50 | 0 | 0 |
| 10 | 25 | 75 | K | 25 | 0 | 0 |
| 11 | 26 | 75 | Na | 50 | 0 | 0 |
| 12 | 27 | 75 | Na | 25 | 0 | 0 |

Examples 16–30

To 100 parts by weight of an isotactic random polypropylene powder (propylene-ethylene random copolymer; ethylene content 2.0%, MFR=15 g/10 min.) were added 0.2 part by weight each of the nucleating agents listed in Table 1, 0.05 part by weight of calcium stearate, and 0.05 part by weight of phosphorus type antioxidant (Tradename "Irgafos 168", Ciba-Geigy), and the mixture was blended in a Henschel mixer at 750 rpm for 5 minutes and extruded under kneading at 240° C. to prepare pellets.

The pellets thus obtained were injection-molded at a resin temperature of 240° C. and quenched to 40° C. to prepare a 1.0 mm-thick sheet. The clarity, gloss, crystallization temperature, flexural modulus, and nucleating agent dispersibility were evaluated in each run. The results are shown in Table 2.

Example 31

Except that calcium stearate was not added, the procedure of Example 23 was otherwise repeated to prepare polypropylene sheets, and the clarity, gloss, crystallization temperature, flexural modulus, and nucleating agent dispersibility were evaluated. The results are shown in Table 2.

Example 32

Except that calcium oxide was added in lieu of calcium stearate, the procedure of Example 23 was otherwise repeated to prepare a polypropylene sheet and the clarity, gloss, crystallization temperature, flexural modulus, and nucleating agent dispersibility were evaluated. The results are presented in Table 2.

Example 33

Except that calcium montanate was added in lieu of calcium stearate, the procedure of Example 23 was otherwise repeated to prepare a polypropylene sheet and the clarity, gloss, crystallization temperature, flexural modulus, and nucleating agent dispersibility were evaluated. The results are shown in Table 2.

Example 34

Except that calcium benzoate was added in lieu of calcium stearate, the procedure of Example 23 was otherwise repeated to prepare a polypropylene sheet and the clarity, gloss, crystallization temperature, flexural modulus, and nucleating agent dispersibility were evaluated. The results are shown in Table 2.

Example 35

The pellets obtained in Example 23 were melted again and extruded under kneading at 240° C. to give pellets. Otherwise, the procedure of Example 23 was repeated to prepare a polypropylene sheet and the clarity, gloss, crystallization temperature, flexural modulus, and nucleating agent dispersibility were evaluated. The results are shown in Table 2.

Comparative Examples 13–24

Using the respective nucleating agents mentioned in Table 1, prescribed polypropylene sheets were prepared and the clarity, gloss, crystallization temperature, flexural modulus, and nucleating agent dispersibility were evaluated in each run. The results are shown in Table 2.

Comparative Example 25

A prescribed polypropylene sheet was prepared without using any nucleating agent and the clarity, gloss, crystallization temperature, flexural modulus, and nucleating agent dispersibility were evaluated. The results are shown in Table 2.

TABLE 2

| | Nucleating agent No. | Haze (%) | Gloss (%) | Tc (° C.) | Flexural modulus (kg/mm²) | Evidence of undispersed nucleating agent |
|---|---|---|---|---|---|---|
| Example 16 | 1 | 12 | 105 | 127 | 113 | o |
| 17 | 2 | 16 | 100 | 127 | 110 | o |
| 18 | 3 | 14 | 102 | 127 | 113 | o |
| 19 | 4 | 14 | 103 | 126 | 111 | o |
| 20 | 5 | 18 | 100 | 124 | 106 | o |
| 21 | 6 | 14 | 103 | 126 | 112 | o |
| 22 | 7 | 18 | 100 | 124 | 106 | o |
| 23 | 8 | 15 | 105 | 127 | 112 | o |
| 24 | 9 | 26 | 95 | 123 | 104 | o |
| 25 | 10 | 20 | 100 | 123 | 105 | o |
| 26 | 11 | 18 | 103 | 129 | 111 | o |
| 27 | 12 | 28 | 90 | 122 | 102 | o |
| 28 | 13 | 15 | 105 | 127 | 112 | o |
| 29 | 14 | 25 | 95 | 123 | 104 | o |
| 30 | 15 | 20 | 100 | 123 | 105 | o |
| 31 | 8 | 20 | 100 | 125 | 106 | o |
| 32 | 8 | 20 | 100 | 124 | 105 | o |
| 33 | 8 | 18 | 105 | 127 | 111 | o |
| 34 | 8 | 20 | 100 | 124 | 105 | o |
| 35 | 8 | 15 | 105 | 127 | 112 | o |
| Comparative | | | | | | |
| Example 13 | 16 | 45 | 85 | 118 | 95 | o |
| 14 | 17 | 30 | 80 | 125 | 110 | x |
| 15 | 18 | 40 | 80 | 124 | 109 | x |
| 16 | 19 | 38 | 79 | 124 | 109 | x |
| 17 | 20 | 25 | 95 | 123 | 103 | x |
| 18 | 21 | 33 | 93 | 121 | 100 | x |
| 19 | 22 | 30 | 90 | 122 | 101 | x |
| 20 | 23 | 38 | 85 | 121 | 98 | x |
| 21 | 24 | 24 | 95 | 124 | 104 | x |
| 22 | 25 | 32 | 94 | 122 | 100 | x |
| 23 | 26 | 30 | 90 | 121 | 102 | x |

TABLE 2-continued

| | Nucleating agent No. | Haze (%) | Gloss (%) | Tc (° C.) | Flexural modulus (kg/mm²) | Evidence of undispersed nucleating agent |
|---|---|---|---|---|---|---|
| 24 | 27 | 38 | 85 | 121 | 100 | x |
| 25 | — | 70 | 75 | 105 | 85 | o |

Examples 36–41

To 100 parts by weight of linear low-density polyethylene resin (MFR=8) were added 0.3 part by weight each of the nucleating agents listed in Table 1, 0.05 part by weight of calcium stearate, and 0.05 part by weight of antioxidant (Tradename "Irgafos 168", Ciba-Geigy) and the mixture was blended in a Henschel mixer at 750 rpm for 5 minutes and extruded at 220° C. to prepare pellets.

The pellets thus obtained were injection-molded at a resin temperature of 220° C. and quenched to 40° C. to provide a 1.0 mm thick sheet. The clarity, gloss, crystallization temperature, flexural modulus, and nucleating agent dispersibility were evaluated. The results are shown in Table 3.

Example 42

Except that calcium stearate was not added, the procedure of Example 39 was otherwise repeated to provide a polyethylene sheet and the clarity, gloss, crystallization temperature, flexural modulus, and nucleating agent dispersibility were evaluated. The results are shown in Table 3.

Example 43

The pellets obtained in Example 39 were melted again and extruded under kneading at 220° C. to prepare pellets. Otherwise the procedure of Example 39 was repeated to provide a polyethylene sheet and the clarity, gloss, crystallization temperature, flexural modulus, and nucleating agent dispersibility were evaluated. The results are shown in Table 3.

Comparative Examples 26–30

Using the respective nucleating agents mentioned in Table 1, prescribed polyethylene sheets were prepared and the clarity, gloss, crystallization temperature, flexural modulus, and nucleating agent dispersibility were evaluated. The results are shown in Table 3.

Comparative Example 31

A prescribed polyethylene sheet was prepared without using any nucleating agent and the clarity, gloss, crystallization temperature, flexural modulus, and nucleating agent dispersibility were evaluated. The results are shown in Table 3.

TABLE 3

| | Nucleating agent No. | Haze (%) | Gloss (%) | Tc (° C.) | Flexural modulus (kg/mm²) | Evidence of undispersed nucleating agent |
|---|---|---|---|---|---|---|
| Example 36 | 1 | 40 | 103 | 112 | 2800 | o |
| 37 | 2 | 55 | 100 | 108 | 2600 | o |
| 38 | 3 | 45 | 102 | 111 | 2700 | o |

TABLE 3-continued

| | Nucleating agent No. | Haze (%) | Gloss (%) | Tc (° C.) | Flexural modulus ($kg/mm^2$) | Evidence of undispersed nucleating agent |
|---|---|---|---|---|---|---|
| 39 | 8 | 45 | 102 | 109 | 2700 | ○ |
| 40 | 9 | 60 | 90 | 105 | 2500 | ○ |
| 41 | 10 | 55 | 95 | 107 | 2600 | ○ |
| 42 | 8 | 55 | 95 | 107 | 2500 | ○ |
| 43 | 8 | 47 | 100 | 109 | 2700 | ○ |
| Comparative | | | | | | |
| Example 26 | 17 | 65 | 85 | 105 | 2500 | x |
| 27 | 20 | 66 | 90 | 105 | 2400 | x |
| 28 | 21 | 71 | 83 | 103 | 2300 | x |
| 29 | 24 | 65 | 90 | 105 | 2400 | x |
| 30 | 25 | 70 | 82 | 103 | 2300 | x |
| 31 | — | 86 | 73 | 100 | 2200 | ○ |

The rosin-based molecular crystal according to the present invention is a novel substance not described in the literature and is of great use as a nucleating agent for polyolefin resin.

We claim:

1. A molecular crystal formed from the following component A and component B:

Component A: dehydroabietic acid or a resin acid mixture of a plurality of monocarboxylic acids selected from the group consisting of dehydroabietic acid, abietic acid, isopimaric acid, levopimaric acid, dihydroabietic acid, neoabietic acid, tetrahydroabietic acid, elliotinoic acid, palustric acid, pimaric acid and sandaracopimaric acid, wherein dehydroabietic acid content of said resin acid mixture is not less than 30 weight %

Component B: at least one resin acid alkali metal salt selected from the group consisting of lithium, sodium and potassium salts of said component A.

2. The molecular crystal according to claim 1 with a component A/component B molar ratio of 1/1.

3. The molecular crystal according to claim 1 with a component A/component B molar ratio of 3/1.

4. The molecular crystal according to claim 1 wherein said component A is dehydroabietic acid.

5. A polyolefin resin nucleating agent comprising a molecular crystal formed from the following component A and component B:

Component A: a dehydroabietic acid or a resin acid mixture of a plurality of monocarboxylic acids selected from the group consisting of dehydroabietic acid, abietic acid, isopimaric acid, levopimaric acid, dihydroabietic acid, neoabietic acid, tetrahydroabietic acid, elliotinoic acid, palustric acid, pimaric acid and sandaracopimaric acid, wherein dehydroabietic acid content of said resin acid mixture is no less than 30 weight %

Component B: at least one resin acid alkali metal salt selected from the group consisting of lithium, sodium and potassium salts of said component A.

6. The polyolefin resin nucleating agent according to claim 5 comprising the molecular crystal wherein component A/component B molar ratio is 1/1 and/or the molecular crystals wherein component A/component B molar ratio is 3/1.

7. The polyolefin resin nucleating agent according to claim 5 wherein said component A is dehydroabietic acid.

8. The polyolefin resin nucleating agent according to claim 5 which has been comminuted to a particle diameter of 1–500 $\mu$m or granulated.

9. The polyolefin resin nucleating agent according to claim 5 which further comprises a calcium salt, calcium hydroxide or calcium oxide in a proportion of 5–200 parts by weight relative to 100 parts by weight of the nucleating agent comprising said molecular crystal.

10. The polyolefin resin nucleating agent according to claim 9 wherein said calcium salt is at least one member selected from the group consisting of calcium salts of aliphatic carboxylic acids having 2–50 carbon atoms, aliphatic sulfonic acids having 2–50 carbon atoms, aliphatic mono- or diesters of phosphoric acid having 2–50 carbon atoms, aromatic carboxylic acids having 7–60 carbon atoms, aromatic sulfonic acids having 6–60 carbon atoms, aromatic mono- or diesters of phosphoric acid having 6–60 carbon atoms, alicyclic carboxylic acids having 7–60 carbon atoms, alicyclic sulfonic acids having 6–60 carbon atoms or alicyclic mono- or diesters of phosphoric acid having 6–60 carbon atoms, and inorganic calcium compounds selected from the group consisting of, calcium silicate, calcium borate, calcium phosphate, calcium nitrate, calcium carbonate and calcium sulfate.

11. The polyolefin resin nucleating agent according to claim 9 wherein the calcium salt is a calcium salt of an aliphatic carboxylic acid having 10–50 carbon atoms.

12. The polyolefin resin nucleating agent according to claim 9 wherein the calcium salt is calcium stearate.

13. A polyolefin resin composition comprising (i) a polyolefin resin and (ii) 0.01–2 parts by weight, per 100 parts by weight of said polyolefin resin, of a nucleating agent for the polyolefin resin, said polyolefin resin composition being prepared by agitating a mixture comprising the polyolefin resin and the nucleating agent, and extruding the mixture at 150 to 300° C. into pellets, said nucleating agent comprising a molecular crystal formed from the following component A and component B:

Component A: dehydroabietic acid or a resin acid mixture of a plurality of monocarboxylic acids selected from the group consisting of dehydroabietic acid, abietic acid, isopimaric acid, levopimaric acid, dihydroabietic acid, neoabietic acid, tetrahydroabietic acid, elliotinoic acid, palustric acid, pimaric acid and sandaracopimaric acid wherein dehydroabietic acid content of said resin acid mixture is not less than 30 weight %

Component B: at least one resin acid alkali metal salt selected from the group consisting of lithium, sodium and potassium salts of said component A.

14. The polyolefin resin composition according to claim 13 wherein said nucleating agent comprises the molecular crystal wherein component A/component B molar ratio is 1/1 and/or the molecular crystal wherein component A/component B molar ratio is 3/1.

15. The polyolefin resin composition according to claim 13 which further comprises a calcium salt, calcium hydroxide or calcium oxide in a proportion of 0.005–0.5 part by weight relative to 100 parts by weight of the polyolefin resin.

16. The polyolefin resin composition according to claim 15 wherein said calcium salt is at least one member selected from the group consisting of calcium salts of aliphatic carboxylic acids having 2–50 carbon atoms, aliphatic sulfonic acids having 2–50 carbon atoms, aliphatic mono- or diesters of phosphoric acid having 2–50 carbon atoms, aromatic carboxylic acids having 7–60 carbon atoms, aromatic sulfonic acids having 6–60 carbon atoms, aromatic mono- or diesters of phosphoric acid having 6–60 carbon atoms, alicyclic carboxylic acids having 7–60 carbon atoms, alicyclic sulfonic acids having 6–60 carbon atoms, or alicyclic mono- or diesters of phosphoric acid having 6–60 carbon atoms, and inorganic calcium salts selected from the group consisting of calcium silicate, calcium borate, calcium phosphate, calcium nitrate, calcium carbonate and calcium sulfate.

17. The polyolefin resin composition according to claim 15 wherein the calcium salt is a calcium salt of a an aliphatic carboxylic acid having 10–50 carbon atoms.

18. The polyolefin resin composition according to claim 15 wherein the calcium salt is calcium stearate.

19. A molded article obtainable by molding the polyolefin resin composition, wherein the polyolefin resin composition comprises:

a polyolefin resin and (ii) 0.01–2 parts by weight, per 100 parts by weight of said polyolefin resin, of a nucleating agent for the polyolefin resin, said polyolefin resin composition being prepared by agitating a mixture comprising the polyolefin resin and the nucleating agent, and extruding the mixture at 150 to 300° C. into pellets, said nucleating agent comprising a molecular crystal formed from the following component A and component B:

Component A: dehydroabietic acid or a resin acid mixture of a plurality of monocarboxylic acids selected from the group consisting of dehydroabietic acid, abietic acid, isopimaric acid, levopimaric acid, dihydroabietic acid, neoabietic acid, tetrahydroabietic acid, elliotinoic acid, palustric acid, pimaric acid and sandaracopimaric acid, wherein dehydroabietic acid content of said resin acid mixture is not less than 30 weight %

Component B: at least one resin acid alkali metal salt selected from the group consisting of lithium, sodium and potassium salts of said component A.

20. The molded article according to claim 19, wherein said nucleating agent comprises the molecular crystal wherein component A/component B molar ratio is 1/1 and/or the molecular crystals wherein component A/component B molar ratio is 3/1.

21. The molded article according to claim 19 which further comprises a calcium salt, calcium hydroxide or calcium oxide in a proportion of 0.005–0.5 part by weight relative to 100 parts by weight of the polyolefin resin.

22. The molded article according to claim 21 wherein said calcium salt is at least one member selected from the group consisting of calcium salts of aliphatic carboxylic acids having 2–50 carbon atoms, aliphatic sulfonic acids having 2–50 carbon atoms, aliphatic mono- or di-esters of phosphoric acid having 2–50 carbon atoms, aromatic carboxylic acids having 7–60 carbon atoms, aromatic sulfonic acids having 6–60 carbon atoms, aromatic mono- or diesters of phosphoric acid having 6–60 carbon atoms, alicyclic carboxylic acids having 7–60 carbon atoms, alicyclic sulfonic acids having 6–60 carbon atoms, and alicyclic mono- or diesters of phosphoric acid having 6–60 carbon atoms, and inorganic calcium salts selected from the group consisting of calcium silicate, calcium borate, calcium phosphate, calcium nitrate, calcium carbonate and calcium sulfate.

23. The molded article according to claim 21 wherein the calcium salt is a calcium salt of an aliphatic carboxylic acid having 10 to 50 carbon atoms.

24. The molded article according to claim 21 wherein the calcium salt is calcium stearate.

* * * * *

UNITED STATES PATENT AND TRADEMARK OFFICE
CERTIFICATE OF CORRECTION

PATENT NO. : 5,998,576

DATED : December 7, 1999

INVENTOR(S) : Sadamitsu et al.

It is certified that error appears in the above-identified patent and that said Letters Patent is hereby corrected as shown below:

Title page,
item [54], after "POLYOLEFIN" (first occurrence) insert --RESINS--,
xftxx change "RESINS" to --RESIN--.

Signed and Sealed this

Eighteenth Day of July, 2000

Attest:

Q. TODD DICKINSON

Attesting Officer

*Director of Patents and Trademarks*